(12) United States Patent
Kovachka-Dimitrova et al.

(10) Patent No.: US 7,735,097 B2
(45) Date of Patent: *Jun. 8, 2010

(54) METHOD AND SYSTEM TO IMPLEMENT A DEPLOY SERVICE TO PERFORM DEPLOYMENT SERVICES TO EXTEND AND ENHANCE FUNCTIONALITIES OF DEPLOYED APPLICATIONS

(75) Inventors: Monika M. Kovachka-Dimitrova, Sofia (BG); Rumiana G. Angelova, Dimitrovgrad (BG)

(73) Assignee: SAP AG, Walldorf (DE)

( * ) Notice: Subject to any disclaimer, the term of this patent is extended or adjusted under 35 U.S.C. 154(b) by 975 days.

This patent is subject to a terminal disclaimer.

(21) Appl. No.: 10/853,374

(22) Filed: May 24, 2004

(65) Prior Publication Data

US 2006/0037030 A1 Feb. 16, 2006

(51) Int. Cl.
*G06F 9/44* (2006.01)
*G06F 15/16* (2006.01)
(52) U.S. Cl. .................. 719/328; 709/203; 719/316
(58) Field of Classification Search .............. 719/310, 719/315, 328, 330, 316; 709/203, 217; 714/38
See application file for complete search history.

(56) References Cited

U.S. PATENT DOCUMENTS

| | | | |
|---|---|---|---|
| 5,999,972 A | 12/1999 | Gish | |
| 6,253,282 B1 | 6/2001 | Gish | |
| 6,266,709 B1 | 7/2001 | Gish | |
| 6,272,555 B1 | 8/2001 | Gish | |
| 6,272,556 B1 | 8/2001 | Gish | |
| 6,304,893 B1 | 10/2001 | Gish | |
| 6,424,991 B1 | 7/2002 | Gish | |
| 6,434,598 B1 | 8/2002 | Gish | |
| 6,604,209 B1* | 8/2003 | Grucci et al. | 714/38 |
| 6,643,650 B1 | 11/2003 | Slaughter et al. | |
| 6,725,453 B1 | 4/2004 | Lucas et al. | |
| 6,745,387 B1 | 6/2004 | Ng et al. | |
| 6,766,477 B2* | 7/2004 | Grucci et al. | 714/38 |
| 6,801,940 B1 | 10/2004 | Moran et al. | |
| 6,832,238 B1* | 12/2004 | Sharma et al. | 709/201 |
| 6,996,588 B2 | 2/2006 | Azagury et al. | |
| 7,076,798 B2 | 7/2006 | Chang et al. | |
| 7,080,092 B2 | 7/2006 | Upton | |
| 7,089,584 B1* | 8/2006 | Sharma | 726/4 |
| 7,150,015 B2 | 12/2006 | Pace et al. | |
| 7,159,224 B2* | 1/2007 | Sharma et al. | 719/310 |
| 7,167,914 B2 | 1/2007 | Cohen et al. | |
| 7,171,478 B2* | 1/2007 | Lueckhoff et al. | 709/227 |

(Continued)

OTHER PUBLICATIONS

""Dreamweaver MX 2004 Using Dreamweaver"", *Macromedia*, Published: Sep. 10, 2003, pp. 1, 2, 59-61.

(Continued)

*Primary Examiner*—Van H Nguyen
(74) *Attorney, Agent, or Firm*—Schwegman, Lundberg & Woessner, P.A.

(57) ABSTRACT

A system and method are described for implementing and using a deploy system for deployment of entities. In one embodiment, a deploy service is implemented as a module on a J2EE engine to perform deployment services on a container on the J2EE engine. The deployment services include deploying one or more entities on the container which includes a J2EE container and/or a non-J2EE container.

5 Claims, 20 Drawing Sheets

U.S. PATENT DOCUMENTS

| | | | |
|---|---|---|---|
| 7,246,358 B2 * | 7/2007 | Chinnici et al. | 719/315 |
| 2001/0011265 A1 | 8/2001 | Cuan et al. | |
| 2002/0178254 A1 | 11/2002 | Brittenham et al. | |
| 2002/0188538 A1 * | 12/2002 | Robertson et al. | 705/35 |
| 2002/0188869 A1 * | 12/2002 | Patrick | 713/201 |
| 2003/0018694 A1 | 1/2003 | Chen et al. | |
| 2003/0018832 A1 * | 1/2003 | Amirisetty et al. | 709/328 |
| 2003/0046639 A1 * | 3/2003 | Fai et al. | 715/513 |
| 2003/0050932 A1 | 3/2003 | Pace et al. | |
| 2003/0061247 A1 | 3/2003 | Renaud | |
| 2003/0093402 A1 | 5/2003 | Upton et al. | |
| 2003/0154266 A1 * | 8/2003 | Bobick et al. | 709/223 |
| 2003/0191803 A1 * | 10/2003 | Chinnici et al. | 709/203 |
| 2003/0204645 A1 * | 10/2003 | Sharma et al. | 709/328 |
| 2003/0236923 A1 * | 12/2003 | Jeyaraman et al. | 709/318 |
| 2004/0068731 A1 | 4/2004 | Davis et al. | |
| 2004/0078495 A1 | 4/2004 | Mousseau et al. | |
| 2004/0078719 A1 * | 4/2004 | Grucci et al. | 714/43 |
| 2004/0139154 A1 | 7/2004 | Schwarze | |
| 2004/0148183 A1 * | 7/2004 | Sadiq | 705/1 |
| 2004/0148370 A1 * | 7/2004 | Sadiq | 709/223 |
| 2004/0148588 A1 * | 7/2004 | Sadiq | 717/109 |
| 2004/0205101 A1 * | 10/2004 | Radhakrishnan | 709/200 |
| 2005/0049938 A1 | 3/2005 | Venkiteswaran | |
| 2005/0080801 A1 | 4/2005 | Kothandaraman et al. | |
| 2005/0165910 A1 * | 7/2005 | Kilian | 709/219 |
| 2005/0262189 A1 * | 11/2005 | Mamou et al. | 709/203 |
| 2005/0262477 A1 | 11/2005 | Kovachka-Dimitrova et al. | |
| 2005/0278274 A1 | 12/2005 | Kovachka-Dimitrova et al. | |
| 2007/0033088 A1 * | 2/2007 | Aigner et al. | 705/9 |

OTHER PUBLICATIONS

Kooijmans, Alex L., et al., "Enterprise JavaBeans for z/OS and OS/390 WebSphere Application Server 4.0", *IBM Corporation: International Technical Support Organization*,, Chapter 5-7.

Orfali, Robert, "Client/Server Programming with JAVA and CORBA Second Edition", by Robert Orfali et al, (1998), pp. 1-230.

Non-Final Office Action for U.S. Appl. No. 10/852,893, Mailed Dec. 31, 2008, 11 pages.

Final Office Action for U.S. Appl. No. 10/854,729, Mailed Mar. 5, 2009, 12 pages.

* cited by examiner

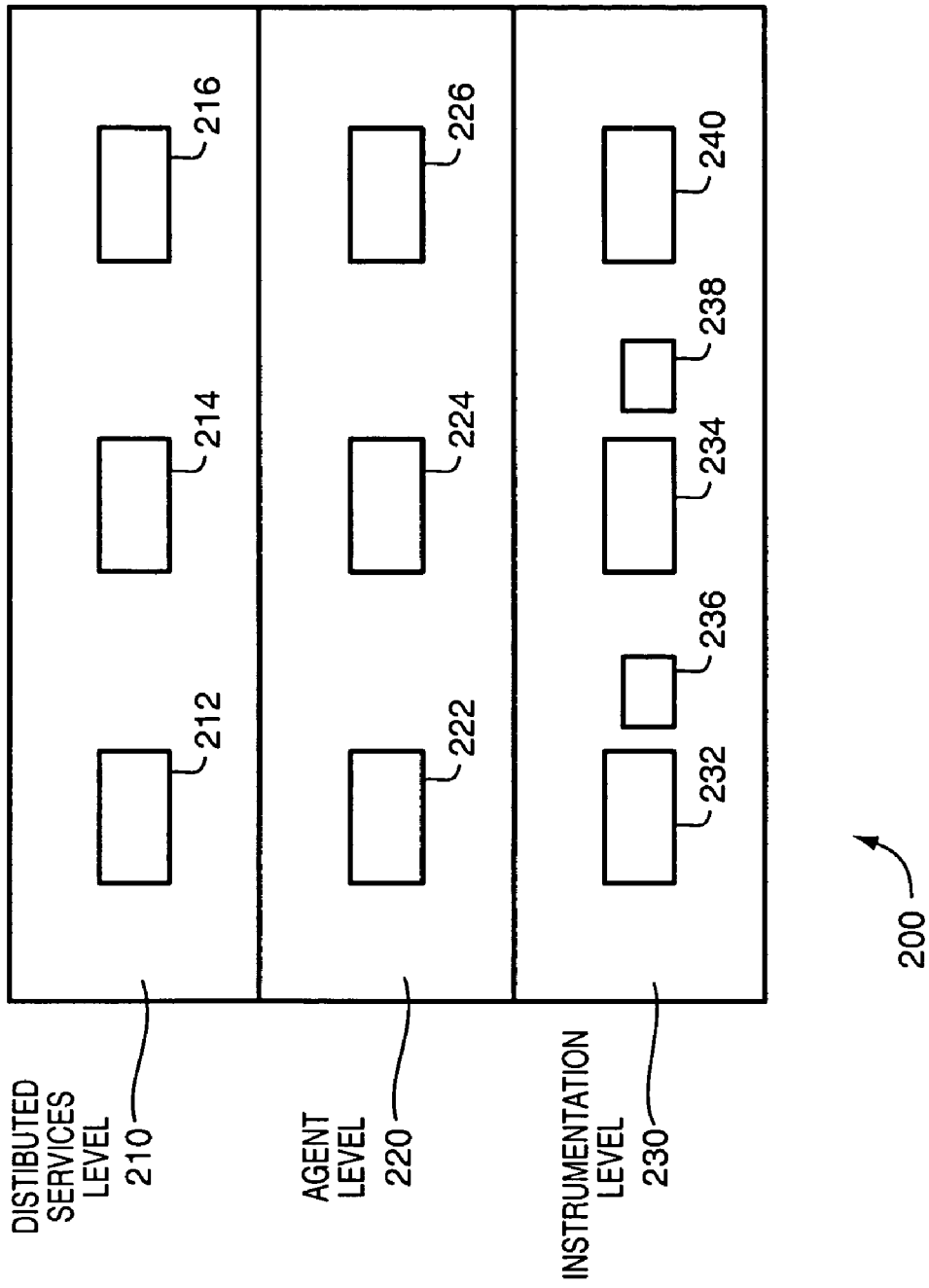

METHOD AND SYSTEM TO IMPLEMENT A DEPLOY SERVICE TO PERFORM DEPLOYMENT SERVICES TO EXTEND AND ENHANCE FUNCTIONALITIES OF DEPLOYED APPLICATIONS

BACKGROUND

1. Field of the Invention

This invention relates generally to the field of deployment. More particularly, an embodiment relates to implementing and using a deploy system to facilitate deployment of entities and expansion of a Java 2 Enterprise Edition architecture (J2EE).

2. Description of the Related Art

Traditional client-server systems employ a two-tiered architecture such as that illustrated in FIG. 1A. Applications 102 executed on the client-side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the Java 2 Platform, Enterprise Edition™ standard, the Microsoft NET standard and/or the Advanced Business Application Programming (ABAP) standard developed by SAP AG.

For example, in a J2EE environment, such as the one illustrated in FIG. 1C, the business layer 122 is to handle the core business logic of the application having Enterprise JavaBean™ (EJB or enterprise bean) components with support for EJB containers 134. While the presentation layer 121 is responsible for generating servlets and Java ServerPages™ (JSP or JSP pages) interpretable with support for Web containers 132 by different types of browsers at the client 125 via a web server 136 a network 103 (e.g., Internet or intranet).

The J2EE engine 130 is a tool commonly used in software development and deployment today. Generally, using the J2EE engine 130 reduces the costs and complexity associated with developing multi-tier enterprise services. Another advantage of J2EE engine 130 is that it can be relatively rapidly deployed and enhanced as the need arises. J2EE engine 130 is currently used in many large-scale application development and deployment projects for these reasons.

However, as application development projects grow larger and are diversified, deployment of applications becomes increasingly important. For example, it is useful to have an improved deployment service and management, including a variety of containers, application interfaces, transaction management and modules, notification and information status system, resource pooling, and security checks.

SUMMARY

A system and method are described for implementing and using a deploy system for deployment of entities. In one embodiment, a deploy service is implemented as a module on a J2EE engine to perform deployment services on a container on the J2EE engine. The deployment services include deploying one or more entities on the container which includes a J2EE container and/or a non-J2EE container.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

FIG. 2 is a block diagram illustrating an embodiment of Java management architecture in which embodiments of the present invention may be implemented;

DETAILED DESCRIPTION

Figure 1A:
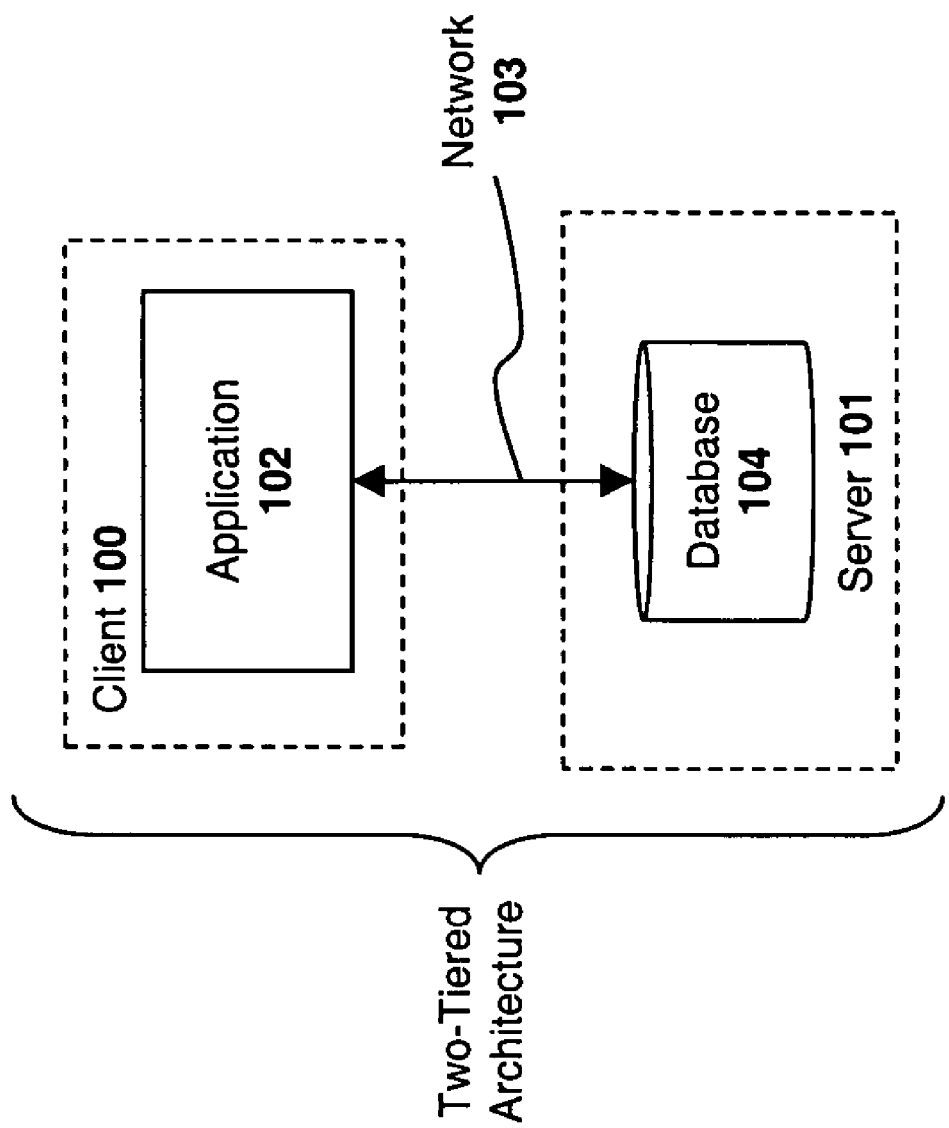
FIG. 1A is a block diagram illustrating a prior art two-tier client-server architecture.
Figure 1B:
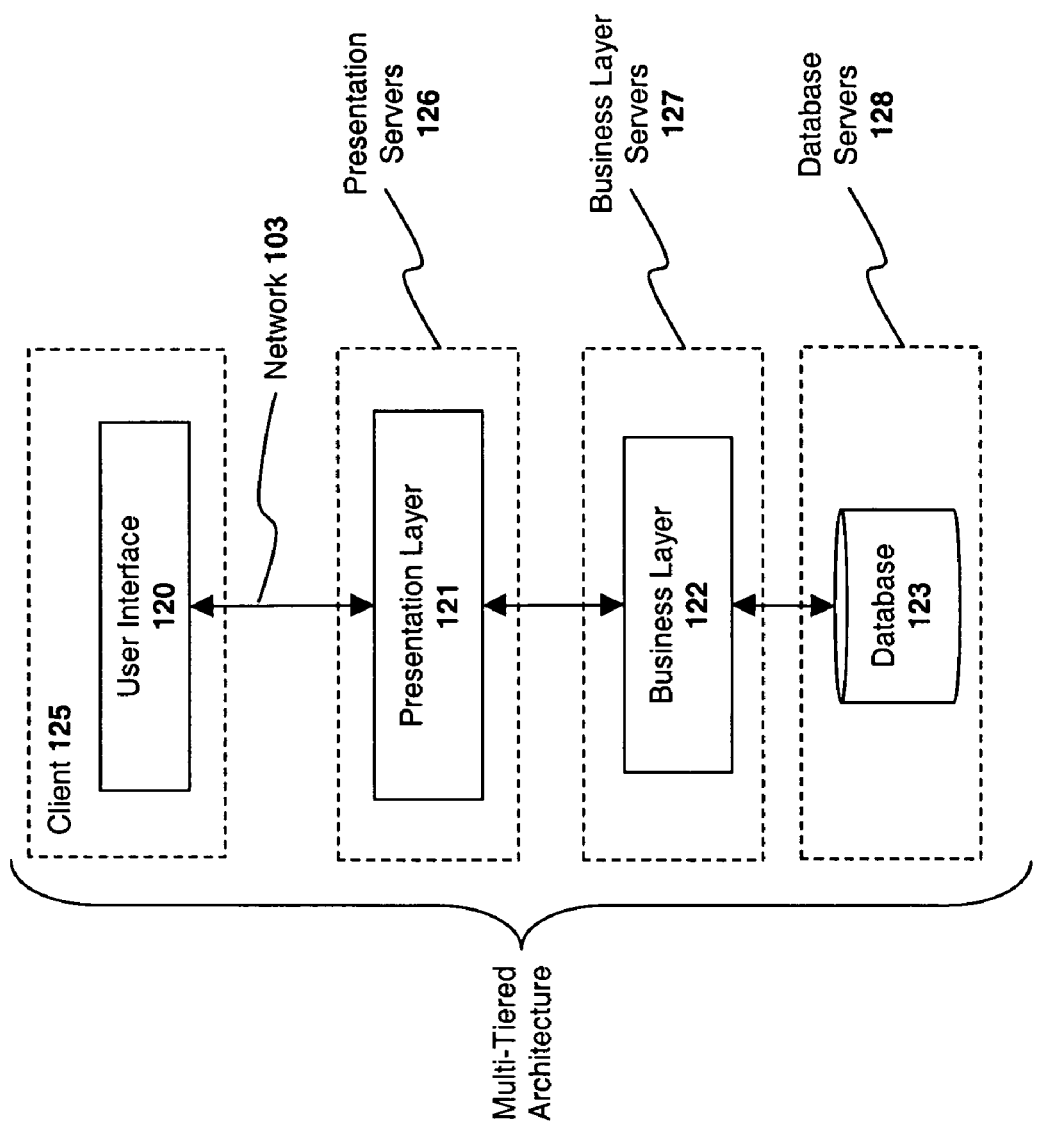
FIG. 1B is a block diagram illustrating a prior art multi-tier client-server architecture.
Figure 1C:
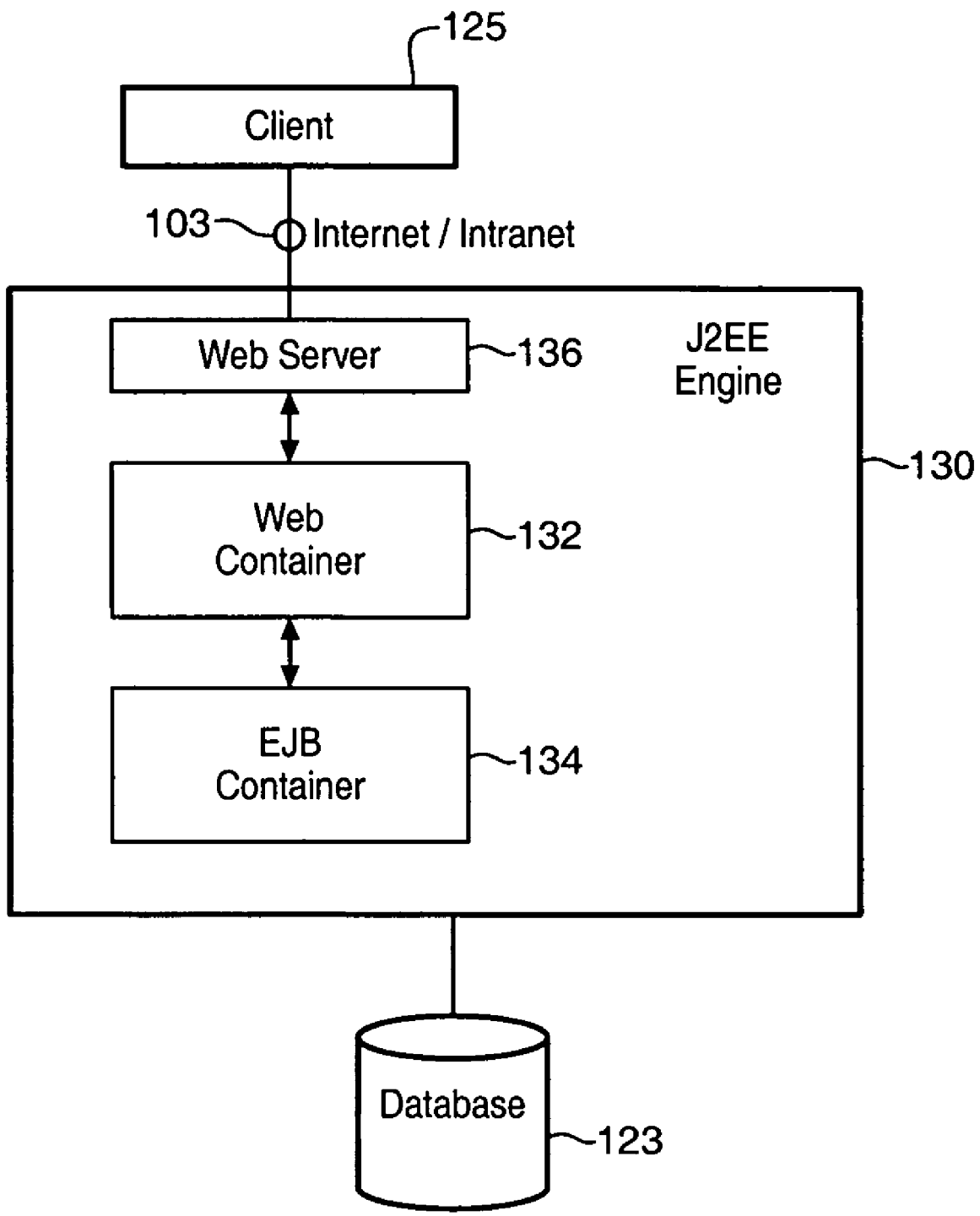
FIG. 1C is a block diagram illustrating a prior art J2EE environment.

Described below is a system and method for implementing and using a deploy service. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIG. 2 is a block diagram illustrating an embodiment of Java management architecture (JMA) 200 in which embodiments of the present invention may be implemented. The illustrated embodiment of JMA 200 is based on Java Management Extensions (JMX). The JMA 200 includes three layers or levels 210, 220, 230, including a distributed services level (or manager or user or client level) 210, an agent level (or application level) 220, and an instrumentation level (or database level) 230. Some or all of the elements at each of levels of the JMA 200 may be, directly or indirectly, interconnected via a network (e.g., a Local Area Network (LAN)). Alternative embodiments of the JMA 200 may include more or fewer levels.

The distributed services level 210 serves as an interface between the JMA 200 and one or more users or clients. As illustrated, the distributed services level 210 includes one or more user terminals 212-214. One or more of the user terminals 212-214 to collect and gather user input and send it to the agent level 220 over a network connection. Network connection may be a wired or wireless connection to a LAN, a Wide Area Network (WAN), a Metropolitan Area Network (MAN), an intranet, and/or the Internet. Distributed services level terminals 212-214 include personal computers, notebook computers, personal digital assistants, telephones, and the like. According to one embodiment in which the network connection connects to the Internet, one or more of the user terminals 212-214 may include a Web browser (e.g., Internet Explorer or Netscape Navigator) to interface with the Internet.

According to one embodiment, the distributed services level 210 also includes management applications 216, such as a JMX-compliant management application, a JMX manager, and/or a proprietary management application. The management applications 216 also include one or more graphical management applications, such as a visual administrator, operating to, for example, retrieve and display information received from the agent level 220 and/or the instrumentation level 230.

The visual administrator includes a monitor viewer to display such and other information. The monitor viewer may be GUI-based or Web-based monitor viewer. Management applications 216 may include third party tools including a file system to store the information. The distributed services level 210 includes the CCMS system described above.

The agent level 220 includes one or more application servers 222-226. An application server may refer to a computing device that performs data processing. The agent level 220 also includes a computing device (e.g., a dispatcher) to perform load balancing among application servers 222-226. According to one embodiment in which the agent level 220 exchanges information with the distributed services level 210 via the Internet, one or more of the application servers 222-226 include a Web application server. According to one embodiment, the application servers 222-226 are implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. In one embodiment, the management techniques described herein are used to manage resources within a "cluster" of server nodes. An exemplary cluster architecture is described below with respect to FIGS. 14-15. However, the underlying principles of the invention are not limited to any particular application server architecture.

The applications servers 222-226 may include one or more dedicated Java Managed Bean (MBean or managed bean) servers having agent services. According to one embodiment, for and at each Java virtual machine (JVM) with managed resources, there may be one or more agents operating at the agent level 220. The one or more agents include one or more MBean servers, agent services, a set of MBeans, one or more connectors, and/or one or more protocol adaptors. An MBean Server includes a registry for MBeans and acts as a single entry point for calling MBeans in a uniform fashion from management applications at other JVMs.

The instrumentation level 230 provides a data storage medium for the JMA 200. As illustrated, according to one embodiment, the instrumentation level 230 includes one or more database management systems ("DBMS") 232-234 and data sources 236-238. According to one embodiment, the data sources 236-238 may include databases and/or other systems capable of providing a data store. Furthermore, the instrumentation level 230 includes one or more hosts including one or more resources having MBeans, such as instrumentation MBeans. The instrumentation level 230 may make Java objects available to management applications 216. The Java objects instrumented according to the JMX-standard may include MBeans. The resources represented by MBeans include managed resources 240, including a kernel, a server component, or the like. MBeans may expose a management interface including constructors, attributes, operations, and notifications.

Figure 3:
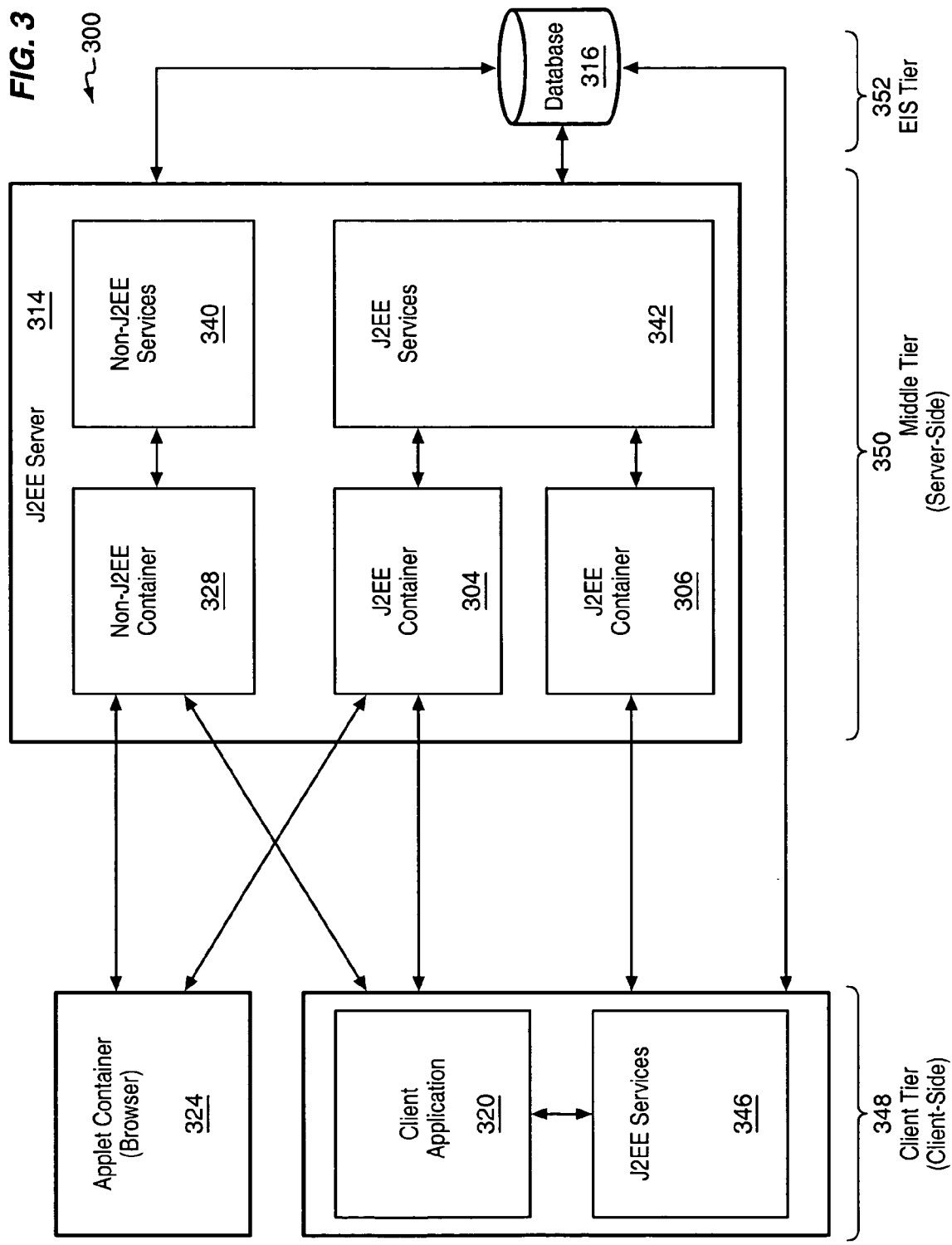
FIG. 3 is a block diagram illustrating an embodiment of a multi-tiered J2EE architecture having a J2EE server employing J2EE and non-J2EE containers and services.

FIG. 3 is a block diagram illustrating an embodiment of a multi-tiered J2EE architecture 300 having a J2EE server 314 employing J2EE and non-J2EE containers 304-306, 328 and services 340-342. As illustrated, the multi-tiered J2EE architecture 300 includes a J2EE server (or engine) 314 having J2EE containers 304-306 on the server-side, and more particularly, in the middle tier 350. The middle tier 350 of the J2EE server (or engine) 314 includes the presentation logic (e.g., Web tier) and business logic (e.g., business tier). Examples of the server-side J2EE containers 304-306 include Web containers and EJB containers. The client tier 348 includes a client application 320 to provide J2EE services 306. The client tier 348 may also include an applet container having a browser 324 to display information.

The J2EE containers 304-306 and the client application 320 are, directly or indirectly, in communication with the database 316, located at the Enterprise Information Systems (EIS) tier 352 of the multi-tiered J2EE architecture 300. The database 316 may include one or more database servers, EJB servers, old systems, and mySAP components. The client application 320 may include standard a J2EE application to help facilitate the running of applications in standalone JVMs. Furthermore, the clients may access one or more of the applications via standalone Java programs and programs that help access an application via, for example, using Internet Inter-Object Request Broker Protocol (IIOP)/Common Object Request Broker Architecture (COBRA) written using any programming language (e.g., –C, C, and C++).

The J2EE containers 304-306 in the middle tier 350 are associated with various J2EE services and APIs 342, examples of which, include Java Naming Directory Interface (JNDI), Java Database Connectivity (JDBC), J2EE connector Architecture (JCA), Remote Invocation (RMI), Java Transaction API (JTA), Java Transaction Service (JTS), Java Message Service (JMS), Java Mail, Java Cryptography Architecture (JCA), Java Cryptography Extension (JCE), and Java Authentication and Authorization Service (JAAS), and dbpool service. The J2EE services 402 further include EJB_service, servlet_JSP, application_client_service, connector_service to provide (J2EE containers 304-306, namely) EJB containers, Web containers, application client containers, and connector containers, respectively. It is contemplated the client application 320 may also be associated with a set of J2EE services and APIs 346. However, each of the containers 304-306 may be associated with a different set of J2EE services. For example, on the client tier 348, the client application may be associated with different J2EE services 346 than the J2EE containers 304-306 associated with the J2EE services 342 on the server-side 350. Furthermore, the client-side 348 may or may not be J2EE-based.

According to one embodiment, as illustrated, the J2EE server 314 includes a non-J2EE container 328 and a set of non-J2EE services and interfaces 340. An example of a non-J2EE container 328 and non-J2EE services 340 may include an SAP container and a set of SAP services and APIs, respectively. The non-J2EE services 340 include Webdynpro service, log_configurator service, and monitoring service. According to one embodiment, non-J2EE components deployed in the non-J2EE container 328 may be used to assemble non-J2EE applications (e.g., SAP applications). In one embodiment, the management of the non-J2EE applications is performed during and after deployment, while the assembly of the non-J2EE applications is conducted prior to deployment. According to one embodiment, both the J2EE and non-J2EE containers 304-306, 328 may have access to the J2EE and non-J2EE services 340-342.

According to one embodiment, some of the non-J2EE services 340 may include parallel or similar services to the J2EE services 342. The container API may be used to facilitate registration, unregistration, implementation, and management of not only the J2EE containers 304-306, but also one or more non-J2EE containers 328 on the J2EE server 314. Using a common container API, both the standard J2EE containers 304-306 and the non-J2EE containers 328 may be deployed on the server-side 350, and the J2EE server 314, as whole, regards them as the same. Stated differently, when deploying a non-J2EE container 328, the specific details in the implementation and logic of the non-J2EE container 328 may be kept hidden from the J2EE server 314 so all J2EE and non-J2EE containers 304-306, 328 are to be recognized and regarded the same way as part of the J2EE architecture 300.

The container API, according to one embodiment, is encapsulated in a service 340-342. This is to, for example, expand the J2EE architecture 300 to provide a relatively easy implementation and deployment of services, interfaces, and libraries, and to provide one or more non-J2EE containers 328, which in turn can deploy any non-J2EE components with relative ease using the same infrastructure. The container API may be represented by an interface defined as a development component with the name, e.g., <container_api>. The implementation of container API may be performed using the deploy service.

According to one embodiment, the deploy service may be used as an entry point for extending the J2EE architecture 300 and for enhancing the functionality of the J2EE engine 314 by deploying the non-J2EE containers 328 along with the J2EE containers 304-306. The deploy service may also be used for the deployment of applications, standalone modules (containing both J2EE and non-J2EE components), service, and libraries.

Figure 4:
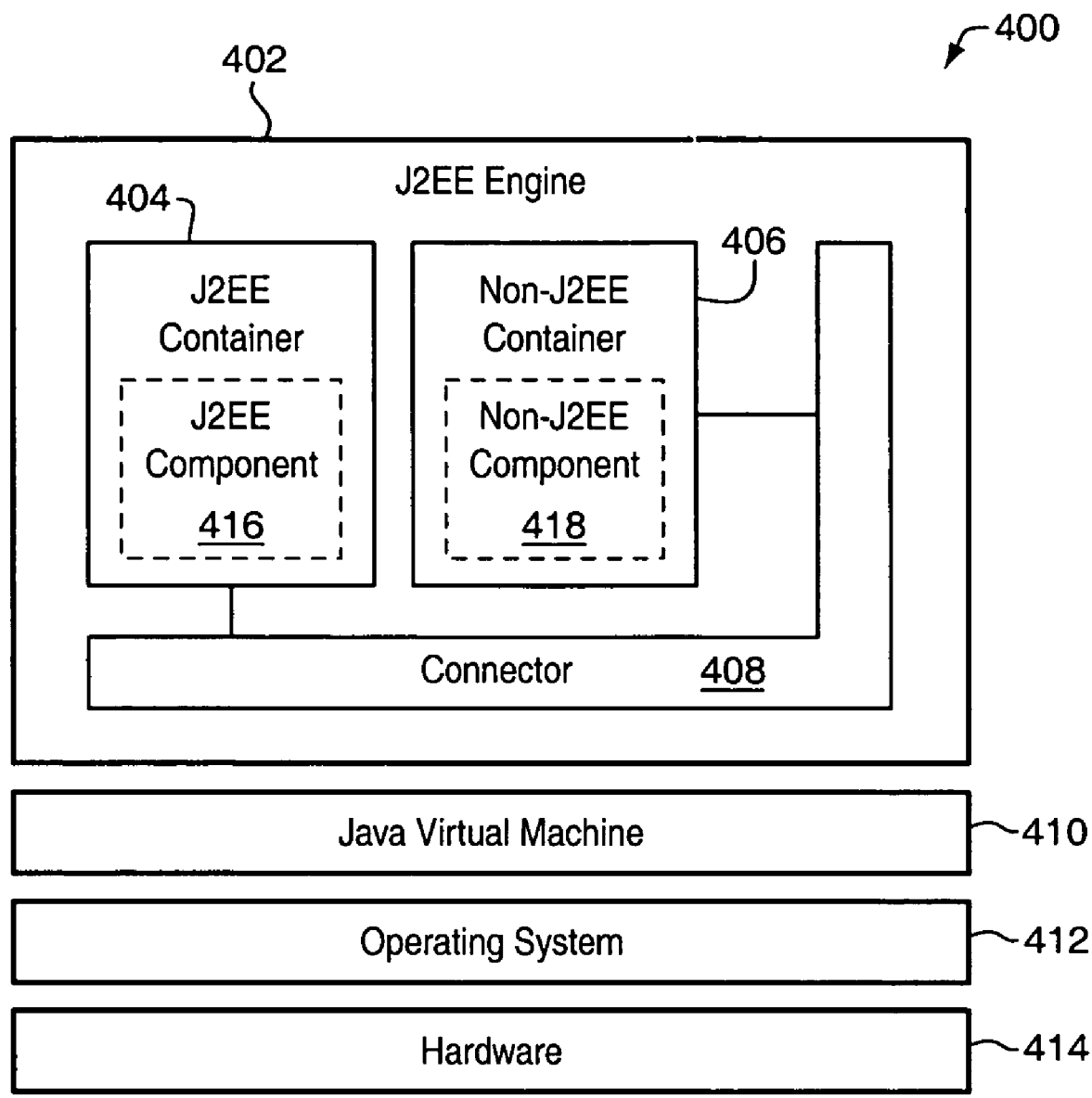
FIG. 4 is a block diagram illustrating a J2EE architecture having J2EE and non-J2EE containers residing on a J2EE engine.

FIG. 4 is a block diagram illustrating a J2EE architecture 400 having J2EE and non-J2EE containers 404-406 residing on a J2EE engine 402. In the illustrated embodiment, the J2EE engine (or server) 402 includes both a J2EE container 404 and a non-J2EE container 406. The J2EE container 404 manages a J2EE component 416, which may be part of a J2EE application. The non-J2EE container 406 manages a non-J2EE component 418, which may be part of a non-J2EE application. The term non-J2EE may refer to a non-J2EE standard element, such as a container 406, component 418, and application and may be synonymous with SAP AG.

The J2EE architecture 400 further includes connectors 408 to provide standard services and APIs to connect the J2EE server 402 and its elements with the rest of the J2EE architecture 400. The connectors 408 may be J2EE or non-J2EE based. The J2EE architecture 400 also includes a JVM 410 to process platform-independent bytecode into platform-specific native code or binary machine code at runtime. The binary machine codes is executed on a hardware 414 using an operating system 412. The operating system 412 may include Microsoft Windows®, Macintosh, Unix, Linux, and the like. The hardware 414 may include a computer processing unit, a storage device, a random access memory, and the like.

Figure 5:
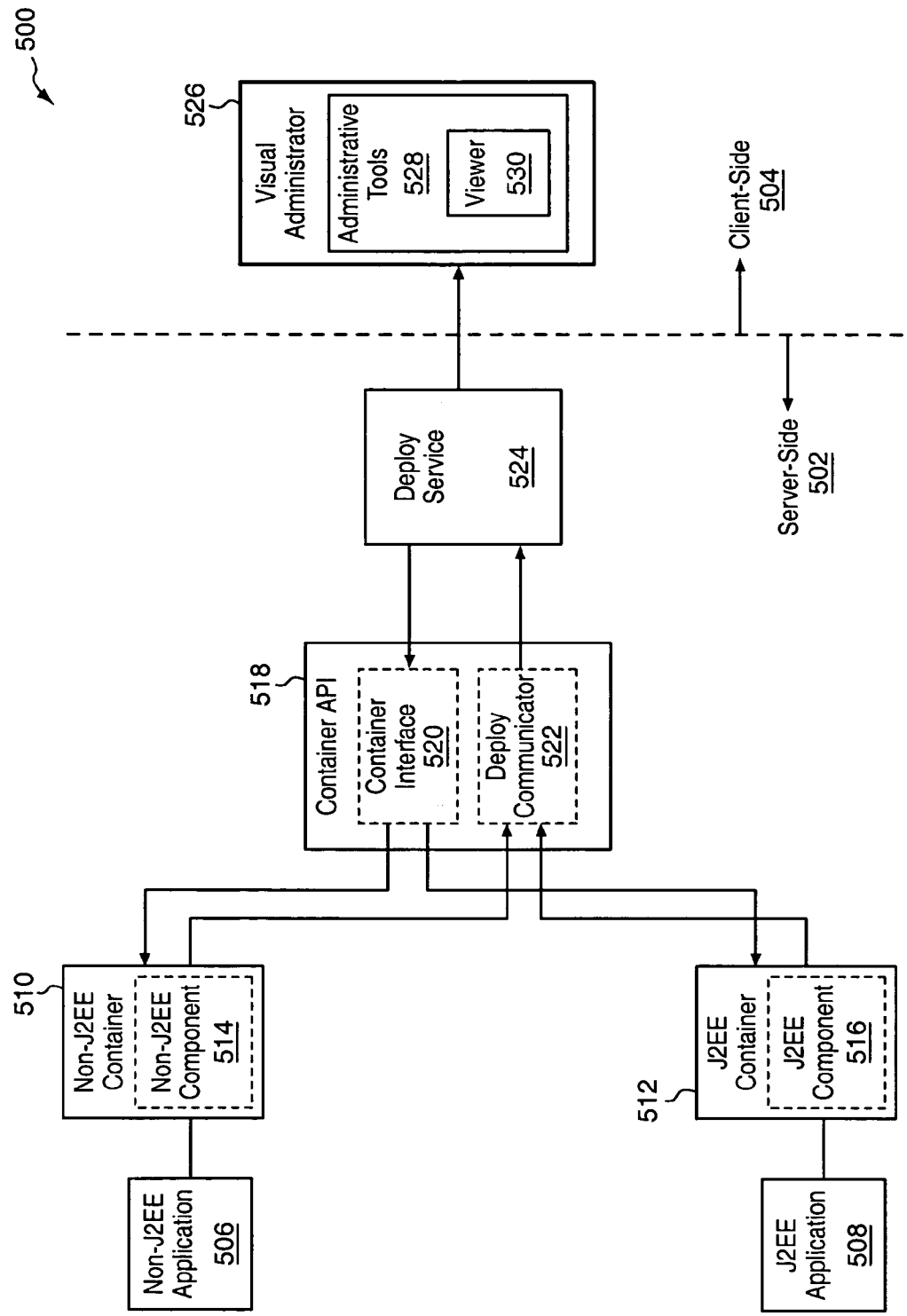
FIG. 5 is a block diagram illustrating a J2EE architecture having a deploy service.

FIG. 5 is a block diagram illustrating a J2EE architecture 500 having a deploy service 524. According to one embodiment, the deploy service 524 serves to extend and enhance the J2EE architecture 500 and its functionalities. The deploy service 524 along with the container API (e.g., SAP container API) 518 help facilitate the deploying of various deployable entities, including J2EE and non-J2EE components 514-516 using J2EE and non-J2EE containers 510-512, respectively. The container API 518 is represented on the server as an interface defined as a development component.

Serving as an entry point for expanding and enhancing the J2EE architecture 500, the deploy service 524 is also used for correct distribution of the deployable entities to their services/containers and a storage place. The storage place is retrieved from configuration manager in the database and the deploy service 524 is to facilitate the storage of all applications so that the containers 510-512 may rely on a consistent storage for the entire application. The application components 514-516 and standalone modules are managed by the containers 510-512, the libraries, services, and interfaces are managed by server's deploy context, which is located at a deeper level in the core of the server because these deployable components are used by applications 506-508 found on a higher level in the J2EE architecture 500. Stated differently, deploy service 524 is used to manage an entire application 506-508, the container 510-512 is used to manage the applications' components 514-516, and the deploy context is used to manage the server components, such as the libraries, services and interfaces. According to one embodiment, the deploy service 524 may obtain the deploy context using its application service context.

According to one embodiment, the container API 518 provides a container interface 520 that is implemented by container services associated with the containers 510-512 (e.g., <com.sap.engine.services.deploy.container.ContainerInterface>). Such implementation is to facilitate the deploy service 524 to identify and process various actions on those containers 510-512 that are implemented according to a set of rules including the implementation of the container API 518 by container services. A container service may listen for the availability of the container interface by implementing a container event listener (e.g., <com.sap.engine.frame.container.event.ContainerEventListener>).

The container API 518 provides a container management for registration of containers 510-512 by container services when an event indicating the availability of the container API 518 (e.g., <container_api>) is received or listened to by a container service via the container event listener. The container service may then register the container 510-512 using container management. In contrast, when a container 510-512 is rendered not available that container 510-512 is unregistered using the container management (e.g., <com.sap.engine.services.deploy.container.ContainerManagement>). Stated differently, the container services are provided with an opportunity to register their corresponding containers 510-512 with the container API 518 and the deploy service 524 when the containers 510-512 become available and are ready to perform deployment operations. In contrast, the containers 510-512 may be unregistered when once they stop or become unavailable.

According to one embodiment, the container API 518 also includes deploy communicator 522 in combination with the container interface 520. The availability of the deploy communicator 522 allows the deploy service 524 and the containers 510-512 to communicate bi-directionally. Stated differently, using the container interface 520, the information flows from the deploy service 524 to the containers 510-512. Each of the containers 510-512 may obtain an instance of the deploy communicator 522 during its registration to communicate back with the deploy service 524.

Using the deploy communicator 522, the information may flow from the containers to the deploy service 524. Such information may include information relating to the status, requesting runtime information, initiating operations from containers 510-512, etc., flowing back to the deploy service 524. Such information allows the deploy service 524 to be more efficient by, for example, allowing the containers 510-512 to request to lock the application or changes that may occur due to some property changes in the container 510-512, or by having the deploy service 524 request the changes by update. Another example includes allowing a container 510-512 to stop its deployed applications in the container service stop method, since applications are usually consisting of more than one component and the deploy service 524 may know the entire configuration of an application.

According to one embodiment, the instance of container information (e.g., <container info>) including information for identification of a container 510-512 may have a set of properties with set/get methods. Some of the properties include: (1) determination of whether a container 510-512 is a J2EE container 512 (e.g., EJB, Web, application, client, resource adapter) or a non-J2EE container 510 (e.g., SAP container); (2) for J2EE containers 512, specification of the type of the components 516 deployed (e.g., String j2eeModuleName); (3) for non-J2EE containers 510, specification of the type of the components 514 deployed (e.g., String moduleName); (4) for specification of the priority of a container 510-512 (e.g., when an application is being deployed, stopped, and started), the deploy service 524 knows in what order to notify the concerned containers 510- 512. During deployment and start of an application, the containers 510-512 having higher priority are notified first, and during stop of an application the containers 510-512 with lower priority are first notified (e.g., int priority); (5) specification of a container's unique name (e.g., String name); (6) specification of a set of extensions of files which represents components 514-516 deployed on the respective containers 510-512 (e.g., String [ ] fileExtentions); (7) specification of a set of names of files which represent components 514-516 deployed on the respective containers 510-512 (e.g., String [ ] filenames); (8) specification of the name of the service that provides the container (e.g., String serviceName); (9) determination of whether the container 510-512 supports the operation "single file update" (e.g., Boolean supportsSingleFileUpdate); and (10) specification of the kind of resource types that are supported by the container (e.g., String [ ] resourceTypes).

According to one embodiment, filenames and extensions may be used by the deploy service 524 for distribution of the deployable components 514-516 on the containers 510-512. The deploy service 524 may include a mechanism for automatic recognition of the container 510-512 to which the corresponding deploying components 514-516 may be distributed, in accordance with the filenames and extensions contained in the <container info> of each of the containers 510-512. For example, if a standalone module file has an extension Web ARchive (e.g., WAR or war) and the J2EE Web container has specified this extension in its <container info>, the deploy service 524 may distribute a WAR file to the Web container.

Figure 6:
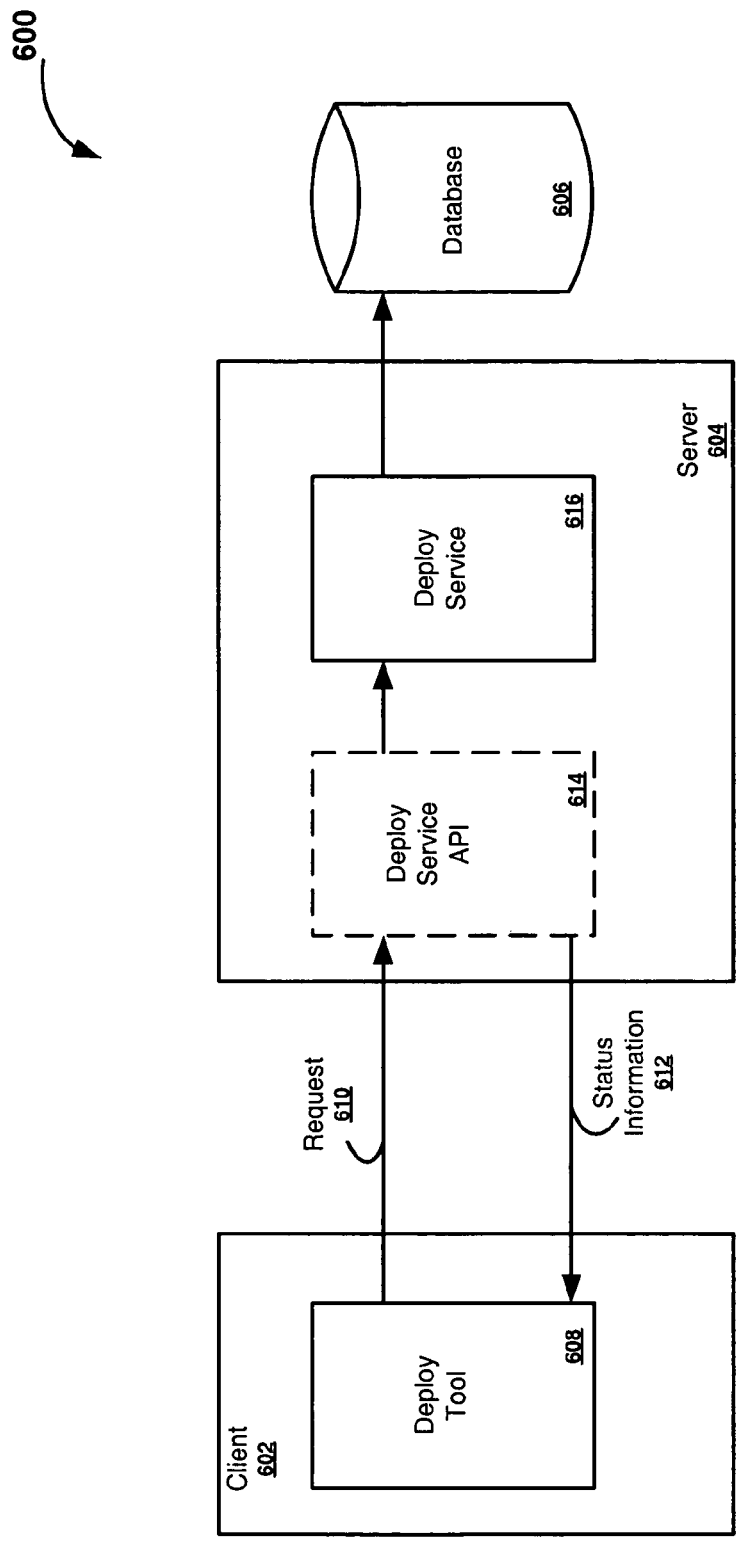
FIG. 6 is a block diagram illustrating an overview of an embodiment of a J2EE architecture having a deployment architecture including a deploy service.

FIG. 6 is a block diagram illustrating an overview of an embodiment of a J2EE architecture having a deployment architecture 600 including a deploy service 616. The J2EE architecture 600 includes a client 602 in communication with a server 604. The communication between the client 602 and the server 604 may be a bi-directional communication 610- 612. The bi-directional communication is facilitated by having a deploy communicator as part of the container API. The server 604 is coupled with a database 606 to store the information communicated to the database 606 from the server 604.

In the illustrated embodiment, the client 602 initiates the request 610 for starting the execution of deploy service operations with the server 604 via a deploy service API 614. The client 602 may include a deployer for performing configuration and deploying of various J2EE and non-J2EE modules on a specific product. In one embodiment, the process of deployment may include: (1) configuration; (2) distribution; and (3) execution. To perform configuration, the client 602, as a deployer, may follow the assembly instructions provided, for example, by the application assembler and help resolve any external dependencies declared by the application component provider. For distribution, the application archive and the deployment configuration information may be installed on various servers in the clusters via the deployment API 614. The execution includes a request 610 made by the client 602 with the deploy service 616 at the server 604 to start or propagate the deployment process.

The server 604, in response to the initiation request 610 from the client 602, propagates the deploy service. According to one embodiment, the deploy service 616 includes a module to accept applications on the server 604, distribute various components of the applications to containers, help manage the containers, facilitate control of the application life cycles and to synchronize them with the component life cycles deployed in the containers. Stated differently, the deploy service 616 is referred to as the entry point for extending and enhancing the functionality of the deployed applications, containers of the deployment architecture 600, and to extent and enhance the J2EE architecture as a whole.

Figure 7:
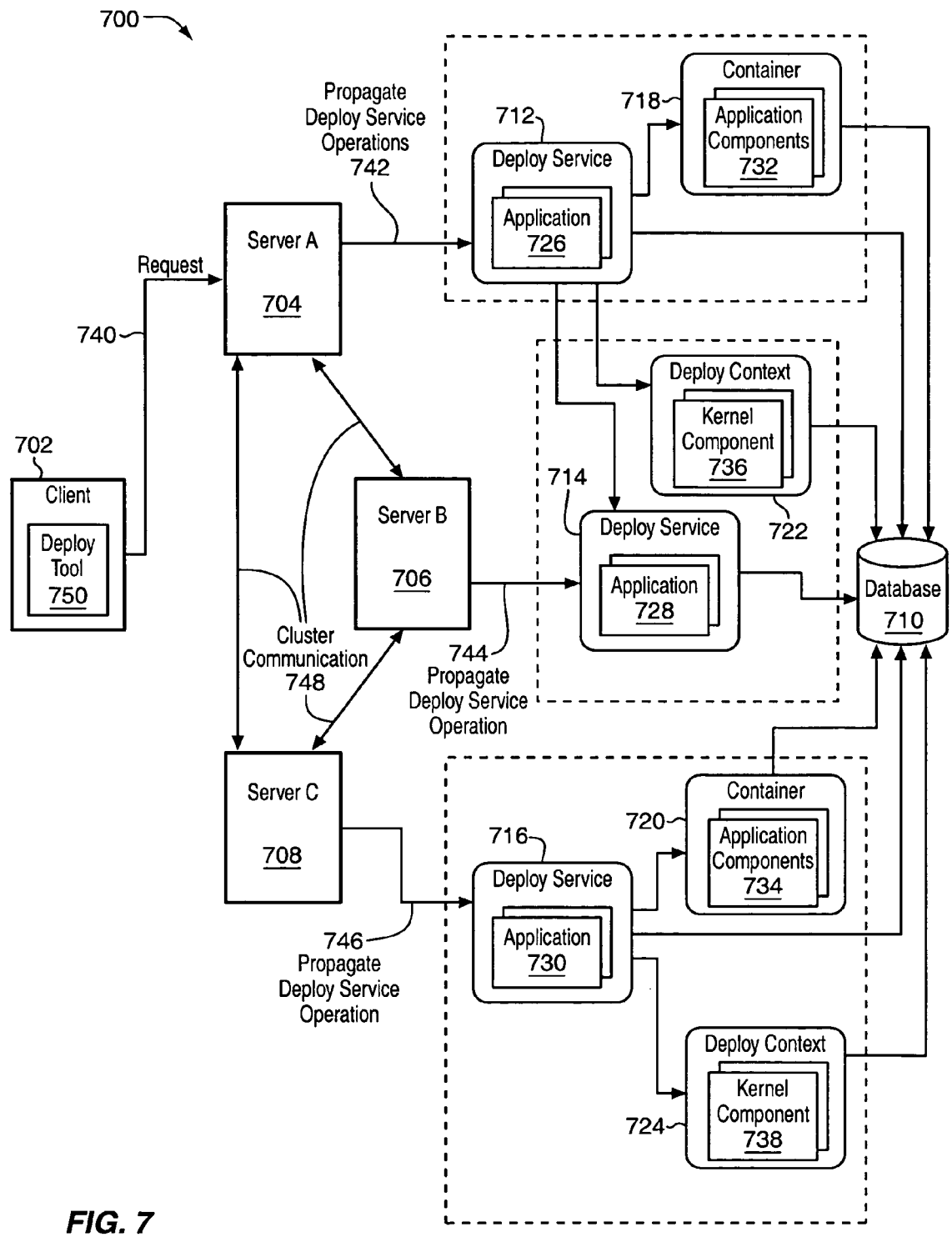
FIG. 7 is a block diagram is an embodiment of a J2EE architecture including a cluster of servers, each server having a deploy service.

FIG. 7 is a block diagram is an embodiment of a J2EE architecture 700 including a cluster of servers 704-708, each server 704-708 having a deploy service 712-716. It is contemplated, the number of clients 702 and servers 704-708 may vary from one to several. In the illustrated embodiment, the deploy service 712-716 may be implemented or the operation of the deploy service 712-716 may be triggered or propagated 742-746 by a server 704 upon receiving a command from the client 702 or in response to a request 740 from the client 702. The server 704 communicates 748 with other servers 706-708 in the cluster regarding the deploy service 712 by sending a notification to each of the servers 706-708. With the notification, the deploy service 714-716 may then be initiated at other servers 706-708 along with the server 704 receiving the request from the client 702 to perform application deployment operations. The server 704 may use the deploy callback system to perform the process of notification. The failure at one or more servers (e.g., server 706) may not stop or interfere with the other server (e.g., 704 and 708) in continuing with the deploy service-related operations. It is contemplated, each of the servers or server nodes 704-708 may have a corresponding deploy service 712-716, each of the servers 704-708 use one deploy service (e.g., 712) having implemented or deployed from one server (e.g., 704).

According to one embodiment, the client 702 places a request 740 with a server 704 via a deploy service API, using a deploy tool 750, to start the deploy service operations. The submitting of the request 740 triggers the propagating 712 of the deploy service operations at the server 704. In one embodiment, a cluster communication 748 may start between various servers 706-708 initiating from the server 704 receiving the request 740 from the client 702. Such cluster communication 748 facilitates deploy service propagation 742-746 of the deploy service 712-716 at all server nodes 704-708. There may be further communication between deploy services, such as between deploy services 712-714, and between other elements of the J2EE architecture 700.

According to one embodiment, the deploy service 712-716 performs distribution of a deployed application 726-730 in the cluster. The deploy service 712, 716 further performs distribution of the deployed application's 726, 730 components 732-734 in the containers 718-720 of the corresponding server nodes 704, 708. The management of the deployed applications 726-730 by the deploy services 712-716 may include maintaining consistent state of the applications 726- 730 in the cluster, maintaining consistent state of the application components 732-734, performing life cycle or deploy operations of the applications 726-730 (e.g., deploy, start, stop, update, and remove), performing transactional operations over the applications 726-730, using the deploy callback system to notify the deploy listeners of the status information and events relating to the deployed applications 726-730 and their components 732-734, and resolving the application references to all other components.

A deploy service 712-716 may be implemented as a module and may serve as an entry point for extending and enhancing the functionality of the servers 704-708 and the J2EE architecture 700 by maintaining and facilitating the deployment of a set of online components to the server, such as the applications 726-730, standalone modules, libraries, interfaces and services. The deploy service 712-716 is also responsible for distribution of these deployable entities to their runtime managers. For example, the application components 732-734 and standalone modules are managed by the containers 718-720 that are implemented using the container API. The libraries, interfaces, and services, regarded as kernel components 736-738, are managed by deploy context 722-724 at a deeper level in the core of the server 706-708. The kernel components 736-738 are used by the applications 726, 730 at a higher level in the J2EE architecture 700.

Stated differently, the deploy service 712-716 helps manage the applications 726-730, the containers 718-720 help manage the application components 732-734, and the deploy context 722-724 facilitates the management of server or kernel components 736-738, such as libraries, interfaces, and services. A part of the container API may be used to administer the containers 718-720 and may be implemented using the deploy service 712-716. Furthermore, the deploy service 712 as a module is used to collect the active containers 718-720 as they are registered. Each of the components 736-738 managed by their containers 718-720 are associated with an application 726 730. For standalone modules, they may be associated with dummy applications (e.g., empty wrappers).

The deploy service 712-716, according to one embodiment, may perform a transaction-oriented management of the applications 726-730. For example, the deploy service 712-716 may use a persistent storage or a database 710 for storing the deployment state or status information relating to the deployment of the applications 726-730. The operations, such as the deploy operations, being performed over an application 726-730 are transactionally recorded on to the database 710 in parallel with the logical transaction of such operations. In one embodiment, the container operations are regarded as part of the deploy service 712-716 and each operation being performed in the deploy service 712-716 having an equivalent in the container API. An operation, such as start, is regarded successfully completed if the corresponding containers 718-720 have completed the operation. The transaction relating to the completed operation is then committed (e.g., recorded) in the database 710. If the operation is incomplete in any of the container and is regarded as incomplete and is rolled back to a previous state. The transaction relating to the incomplete operation may not be committed to the database 710.

Figure 8:
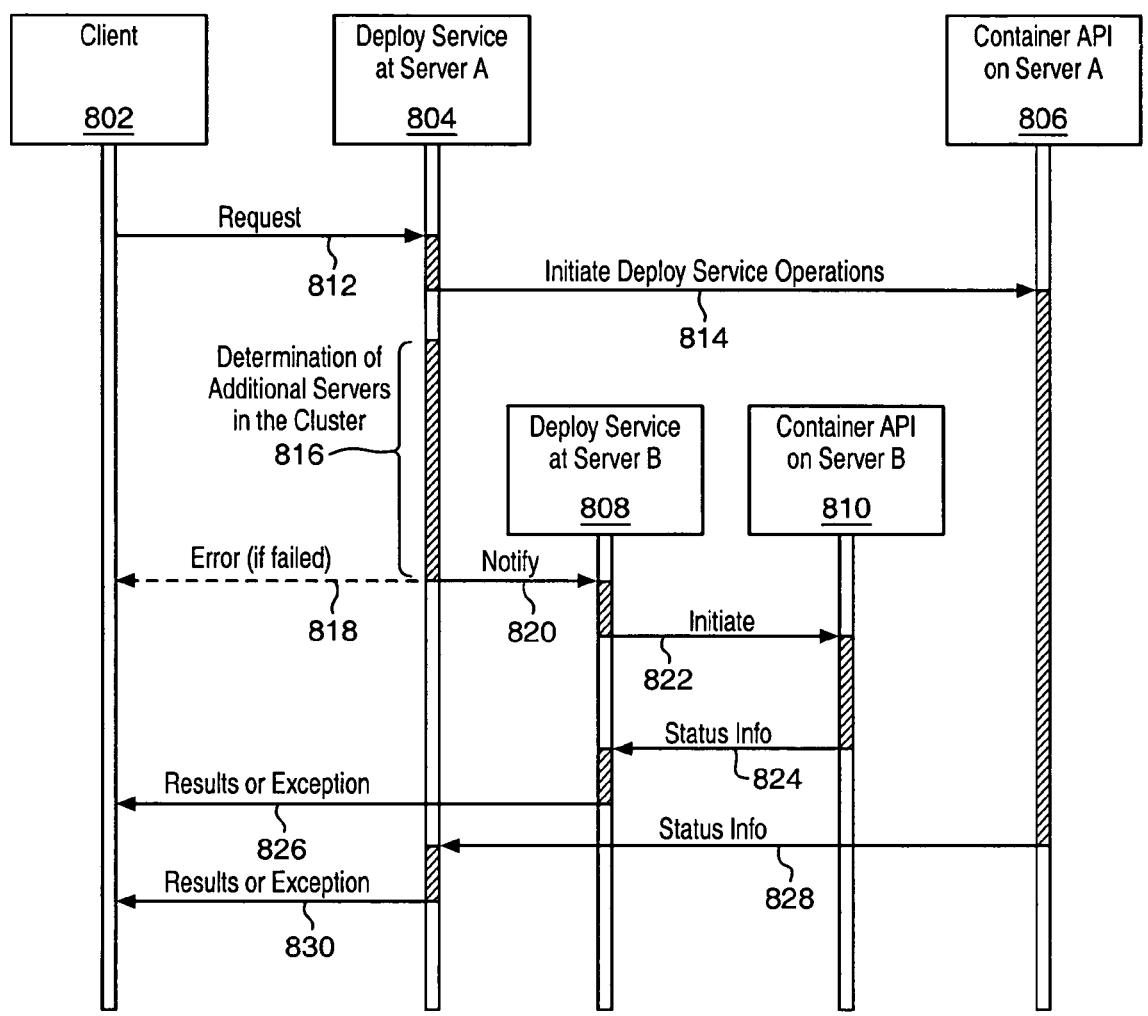
FIG. 8 is a block diagram illustrating an embodiment of an information transmission sequence for using a deploy service.

FIG. 8 is a block diagram illustrating an embodiment of an information transmission sequence for implementing and using a deploy service 804, 808 for performing deploy service operations. In the illustrated embodiment, a client 802 places a request 812 for initiating deploy service operations using the deploy service at server A 804 and at other servers in the cluster. In response to the request 812, the deploy service at server A 804 initiates the deploy service operations 814 by conveying the message to, for example, the containers, via a container API at server A 806. The deploy service operations are initiated at server A and as the operations progress, status information 828 is sent from the container via the container API at server A 806 to the deploy service at server A 804. Based on the status information 828 received, the status result of the successful operations (or a status exception if an operation has failed) 830 is sent to the client 802. If the initiation of the deploy service operations is unsuccessful, a notification error regarding the failure to initiate may be sent from the container via the container API at server A 806 to the deploy service at server A 804 and then to the client 802.

According to one embodiment, at server A, using the deploy service at server A 804, a determination of additional servers in the cluster 816 is made. If there are no more servers in the cluster, the deploy service operations continue at server A. If there are other servers in the cluster, a notification 820 regarding initiating the deploy service operations is made to other servers, such as to the deploy service at server B 808. If the notification fails, an error 818 regarding the failure is sent to the client 802. With successful notification, the deploy service at server B 808, as with the deploy service at server A 804, initiates the deploy service operations 822 by sending a message to the container at server B via the container API at server B 810. As with server A, if the initiation of the deploy service operations is unsuccessful, a notification error regarding the failure to initiate may be sent from the container via the container API at server B 810 to the deploy service at server B 808 and then to the client 802. The deploy service operations are initiated 822 at server B and as the operations progress, status information 824 is sent from the container via the container API at server B 810 to the deploy service at server B 808. Based on the status information 824 received, the status result of the successful operations (or a status exception if an operation has failed) 826 is sent to the client 802.

Figure 9:
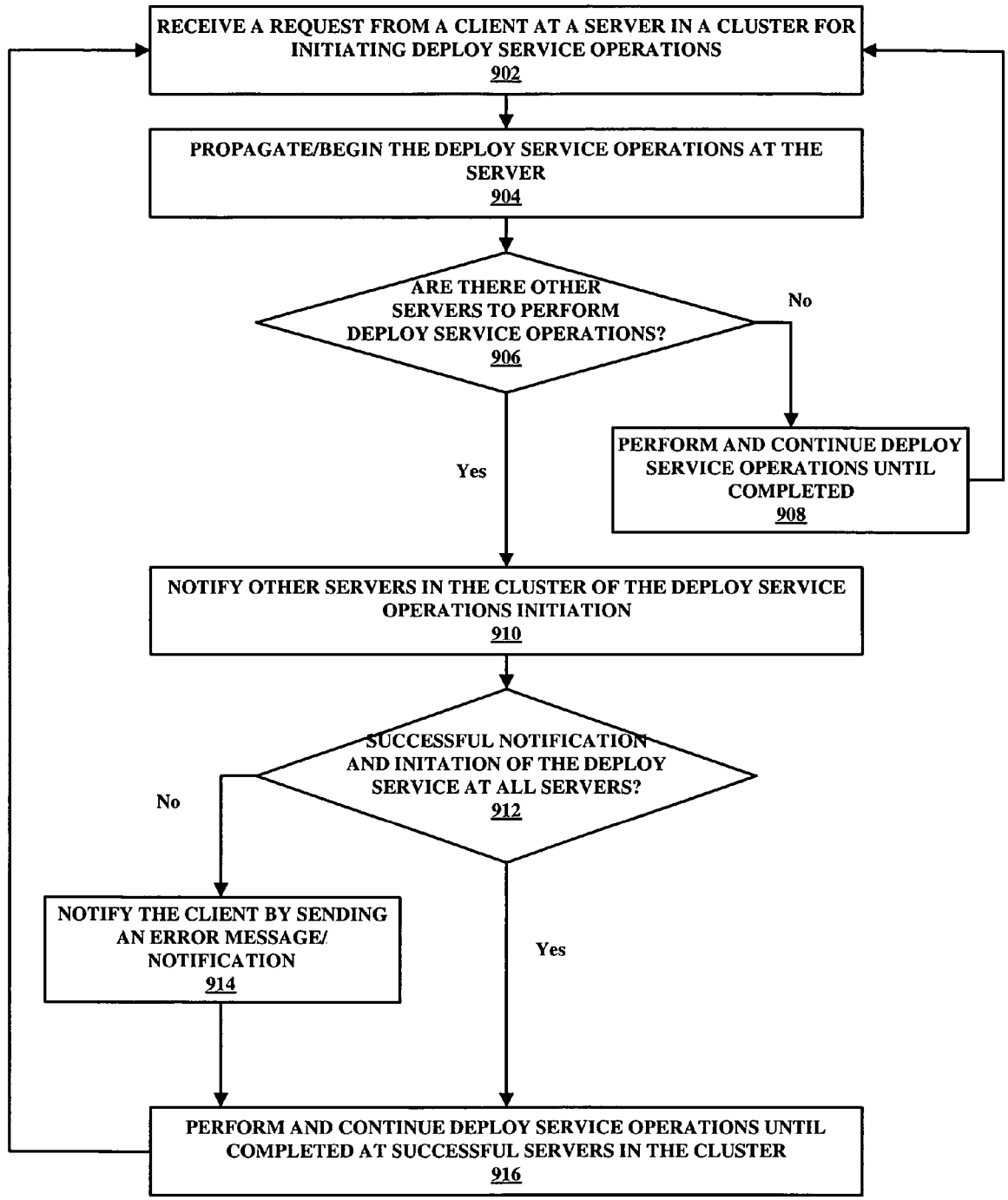
FIG. 9 is a flow diagram illustrating an embodiment of a process for implementing and using a deploy service for performing deploy service operations.

FIG. 9 is a flow diagram illustrating an embodiment of a process for implementing and using a deploy service for performing deploy service operations. First, according to one embodiment, a request for initiating deploy service operation is received from a client at a server at processing block 902. The server, in response to the request from the client, propagates various deploy service operations at processing block 904. At decision block 906, a determination is made as to whether there are other servers to perform deploy service operations. If no other servers are to be notified, the performing of the deploy service operations begins and continues at the server receiving the request from the client until the operations are completed at processing block 908. The completion of the operations may include successful operation of all deploy operations or successful completion of some deploy operations or even an interruption of some kind to end the deploy service operations process for some or all of the operations. Once the deploy operations have completed, the server waits for another request from the client at processing block 902.

In one embodiment, if there are other servers in a cluster to be notified, the notification relating to the initiation of the deploy service operations is given to other servers in the cluster by the server receiving the request from the client at processing block 910. The notification may be given to the deploy services at other servers in the cluster (e.g., from the deploy service on one server to the deploy service on other servers). Furthermore, the notification may be given using a deploy callback system. It is contemplated, each of the servers may have a corresponding deploy service in communication with deploy services at other servers, or a single deploy service may be used for some or all of the servers residing at the cluster.

At decision block 912, a determination is made as to whether the notification sent to other servers in the cluster was successful. If the notification was not successful at any of the servers, an error message is sent to the client at processing block 914. Stated differently, due a failure of notification to one or more servers or even due to the failure of one or servers to initiate the deploy service operations, the process of performing the deploy service operations at other successful servers is not stopped. Instead, an error is sent to the client about the failure of one or more servers. Other servers in the cluster may not know about the failure or the notification error. At processing block 916, in case of a successful notification or/and after notifying the client via an error, the process of performing the deploy service operations continues at successful servers until the process is completed as described with reference to processing block 908. Once the operations are completed, the server waits for another request from the client at processing block 902.

Figure 10:
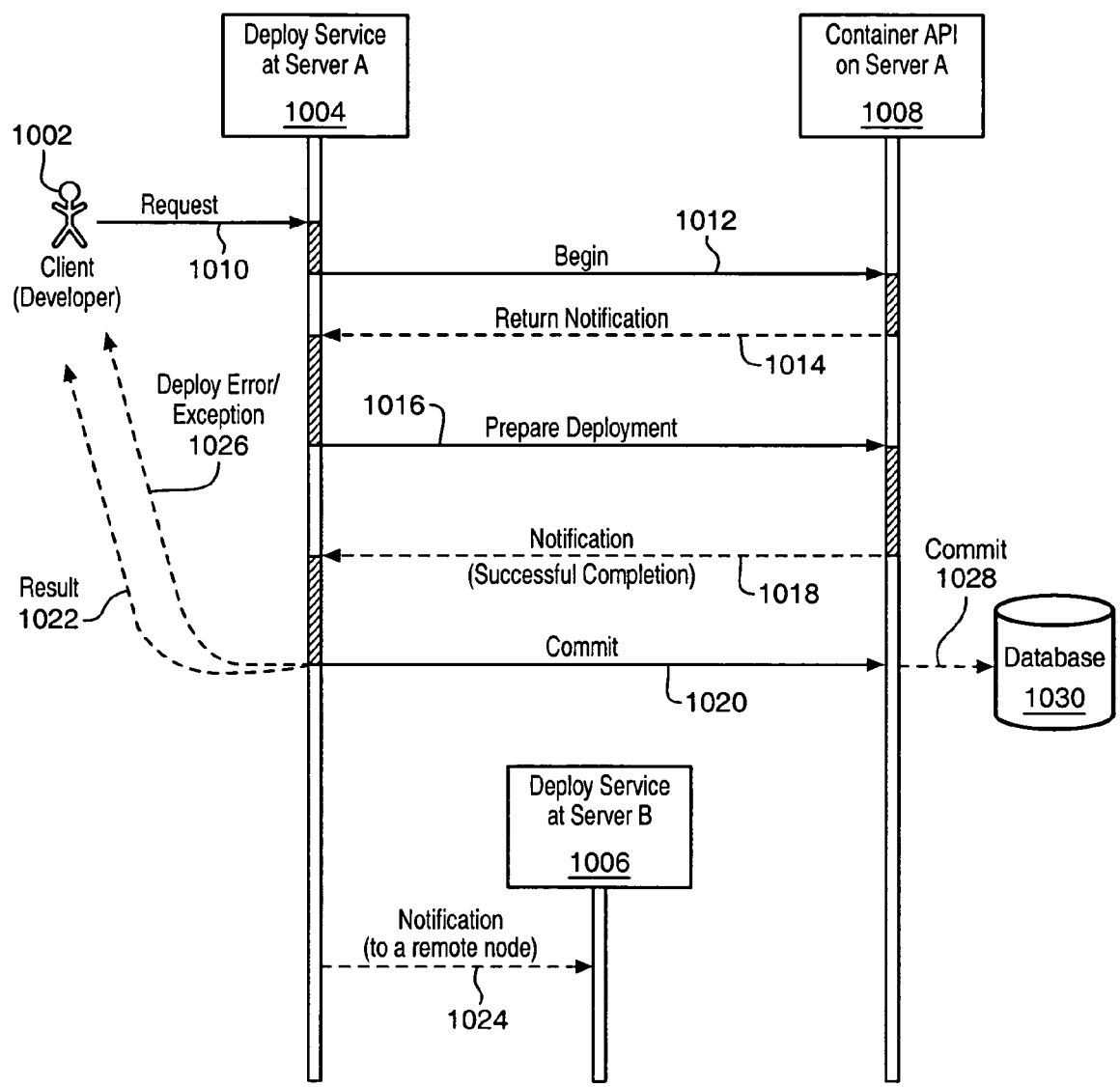
FIG. 10 is a block diagram illustrating an embodiment of an information transaction sequence when performing deploy service operations.

FIG. 10 is a block diagram illustrating an embodiment of an information transaction sequence when performing deploy service operations. As illustrated, a client (or deployer) 1002 requests the deploying of entities (e.g., deploy service, application, ear file, properties) on various servers. The method for the request includes: <public String[ ] deploy(String earFile, String[ ] remoteSupport, Properties props) throws java.rmi.RemoteException>. The request 1010 for deployment is received by a deploy service at server A 1004 and, in response to the request 1010, the deploy service 1004 begins 1012 the deployment of an entity with the corresponding container at server A via a container API 1008. In one embodiment, the beginning 1012 of the deployment process includes implementing and deploying of the deploy service 1004. The initiation or beginning of the deployment 1012 includes starting various deploy service operations and deploying of container deployment information. The deploy service operations may include such examples as deploy, start, stop, remove and update. The beginning 1012 of the deployment (e.g., of an application) is started with the following method: <public ApplicationDeployInfo deploy(File[ ] archiveFiles, ContainerDeploymentInfo dInfo, Properties props) throws DeploymentException>. The container via the container API 1008 may respond to the deploy service 1004 regarding successful start of the deploy service operations by, for example, a return notification 1014 including files generated to be send over the cluster to other servers.

The deploy service 1004, upon receiving the return notification 1014 from the container via the container API 1008, prepares for deploying 1016 of the application. For deployment preparation 1016, the deploy service may use the following method: <public void prepareDeploy(String applicationName, Configuration appConfig) throws DeploymentException, WarningException>. If the deployment preparation 1016 is successful, the container 1008 communicates back with the deploy service 1004 with a response or notification 1018 indicating the success. In one embodiment, the notification 1018 may be communicated from various containers at various servers, via their corresponding container APIs, to the deploy service 1004 or to the deploy services at their corresponding servers.

According to one embodiment, upon receiving the notification 1018, the successful deployment status relating to any or all of the deploy service operations is then committed 1020 to the container via container API 1008. The status may also be committed 1028 to a database 1030 for performing transactional commitment of the state of deployment in addition to the logical commitment 1020. The commitment 1028 regarding the application deployment is performed by the deploy service 1004 using, for example, the following method: <public void commitDeploy(String applicationName) throws WarningException>. In one embodiment, if a deployment exception is thrown or an error of some kind has occurred at anytime during the beginning 1012 of deployment and receiving of the notification 1018, the deployment may be stopped and/or rolled back to the previous step. In one embodiment, if the transaction is not committed, the rolling back of the transaction is performed using, for example, the following method: <public void rollbackDeploy(String applicationName) throws DeploymentException>.

The deploy service 1004 then provides a result 1022 for a successful transaction or state of the application deployment to the client 1002. If the transaction is unsuccessful (e.g., a rollback occurred), an exception or error 1026 is provided to the client 1002. In one embodiment, the deploy service 1004 provides a notification 1024 regarding the state of the transaction to one or more deploy services at their corresponding servers, such as the deploy service at server B 1006. The notification 1024 is provided by invoking, for example, the following method: <public void notifyDeployedComponents (String applicationName, Properties props) throws WarningException>. Such notification 1024 is communicated via the deploy service API corresponding to the deploy service at server A 1004 and the deploy service API corresponding to the deploy service at server B 1006.

Figure 11:
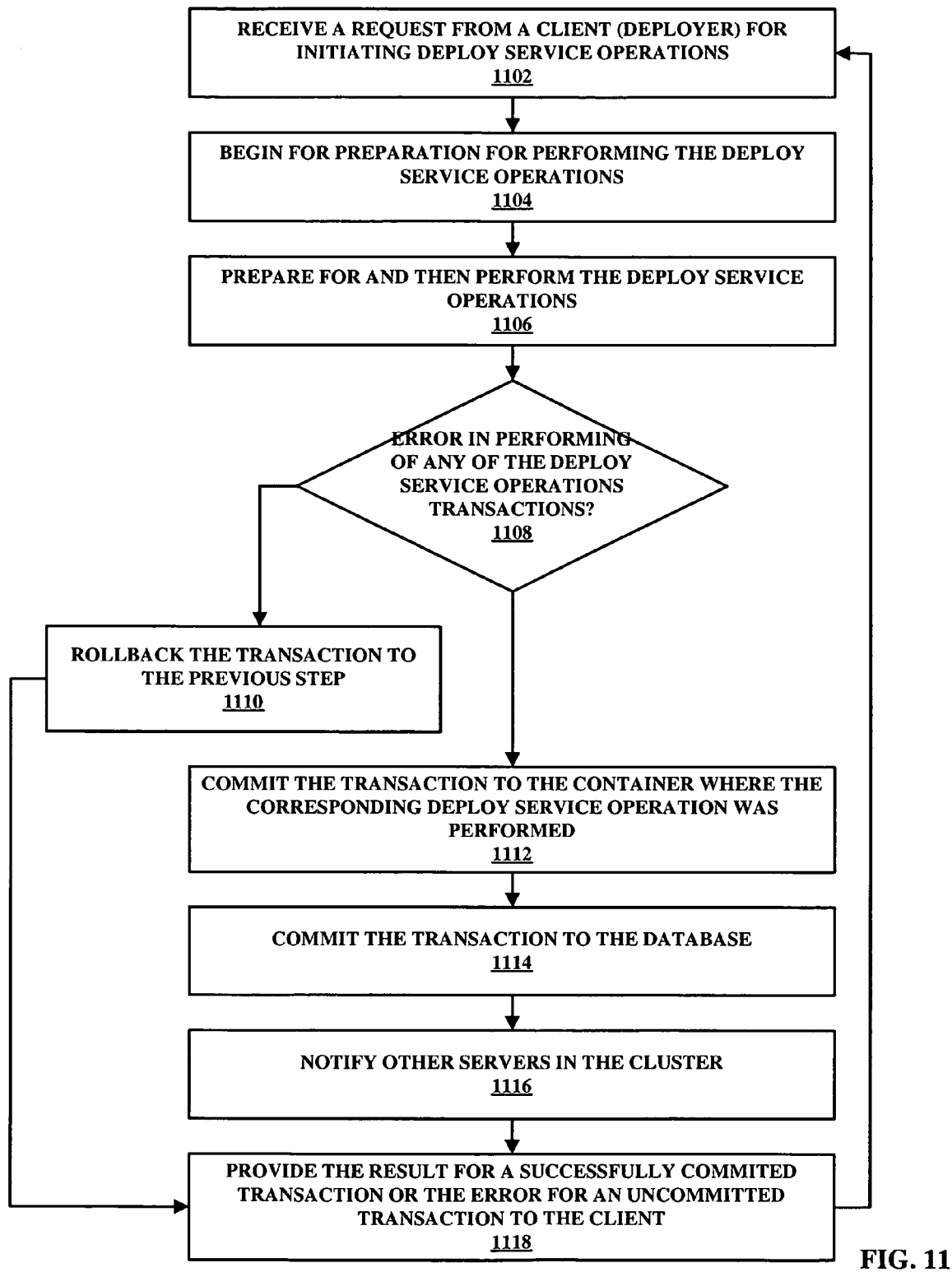
FIG. 11 is a flow diagram illustrating an embodiment of a process for performing deploy service operations.

FIG. 11 is a flow diagram illustrating an embodiment of a process for performing deploy service operations. A request for performing deploy service operations (e.g., for deploy of a deploy service or related entities) is received from a client (or deployer) at a server at processing block 1102. Upon receiving of the request, the propagation of the deploy service operations starts with the beginning of preparation for performing the deploy service operations at processing block 1104. The beginning of preparation includes searching the archives and containers for related information previously registered. The container may open its own Java ARchive (e.g., JAR or jar) file and make sub-configurations based on the root configuration. The deploy service operations are prepared and performed at processing block 1106.

At decision block 1108, a determination is made as to whether a deployment exception was thrown due to an error in deploying. If the deployment exception has occurred, the transaction is stopped and rolled back to its previous step at processing block 1110. It the deployment exception is not thrown, and the transaction is successful, it is committed to the corresponding container at processing block 1112. The transaction is then committed to a database at processing block 1114. Furthermore, once the transaction is committed, a notification is given to other servers or server nodes regarding the commitment of the transaction at processing block 1116. Depending on whether the transaction was committed or rolled back, a result for the committed transaction or an exception for a rolled back transaction is provided back to the client at processing block 1118.

Figure 12:
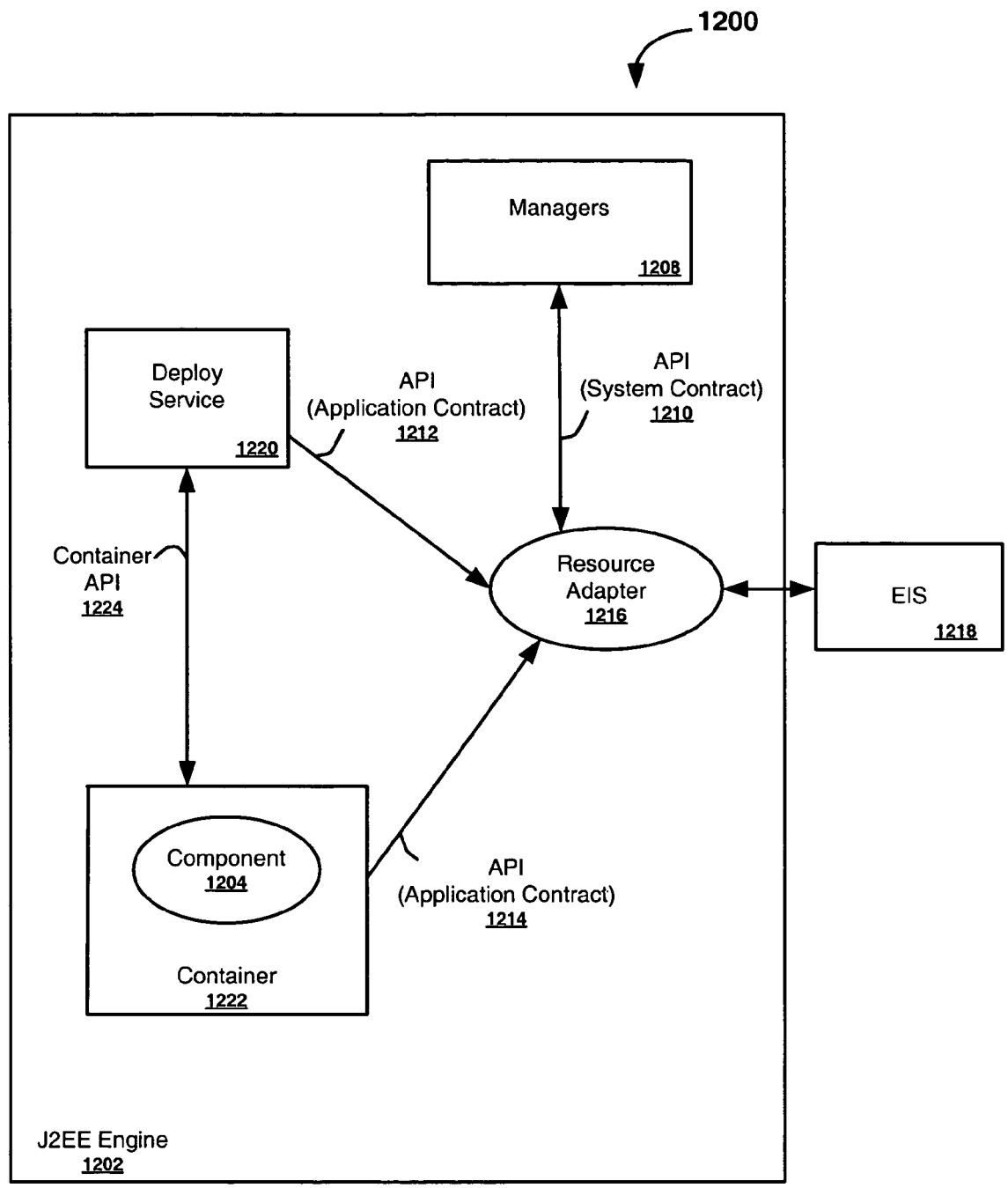
FIG. 12 is a block diagram illustrating an embodiment of a J2EE connector architecture including a deploy service.

FIG. 12 is a block diagram illustrating an embodiment of a J2EE connector architecture 1200 including a deploy service 1220. In the illustrated embodiment, the J2EE architecture 1200 enables application components 1204, including J2EE and non-J2EE components, to interact with an enterprise information system (EIS) 1218. Similarly, the J2EE and non-J2EE applications communicate with the EIS 1218 via the resource adapter 1216. The EIS software associated with the EIS 1218 may include various systems, enterprise resource planning (ERP), mainframe transaction processing, and databases. The EIS 1218 includes back-end database or data management components that run on the database server. The EIS 1218 may include persistent storages or databases, database servers, EJB servers, old systems, mySAP components, and the like. It is contemplated, not all components 1204 are required to have access to the EIS 1218.

As illustrated, the J2EE connector architecture 1200 includes a resource adapter 1216, also referred to as a component, to provide connectivity to a specific EIS or EIS system 1218. The resource adapters 1216 are provided by various EIS vendors. The J2EE connector architecture 1200 may also include various J2EE or non-J2EE products to allow the resources adapters 1216 to be plugged in to the platform implementation. A resource adapter 1216 may be stored in a Resource Adapter aRchive (RAR) file and deployed on a J2EE server, similar to an Enterprise ARchive (e.g., EAR or ear) file of a J2EE application. Also, an RAR file may reside in an EAR file or it may exist as a separate file.

According to one embodiment, a deploy service 1220 communicates with various containers 1222, each having application components 1204, via a container API 1224. The deploy service 1220 facilitates the management of the container 1222 and of the application assembled using the application component 1204. The deploy service 1220 and the container 1222 communicate with the resource adapter 1216 via application contracts or APIs 1212-1214. The resource adapter 1216 is then used by the deploy service 1220 and the container 1222 to communicate with the EIS 1218. Similarly, the mangers and/or services 1208 are linked with the resource adapter 1216 via an API or services contract 1210 to link the EIS 1218 with various services, such as security, transaction, and connectivity, managed by the server. The APIs 1210-1214 are implemented by the resource adapter 1216.

Figure 13A:
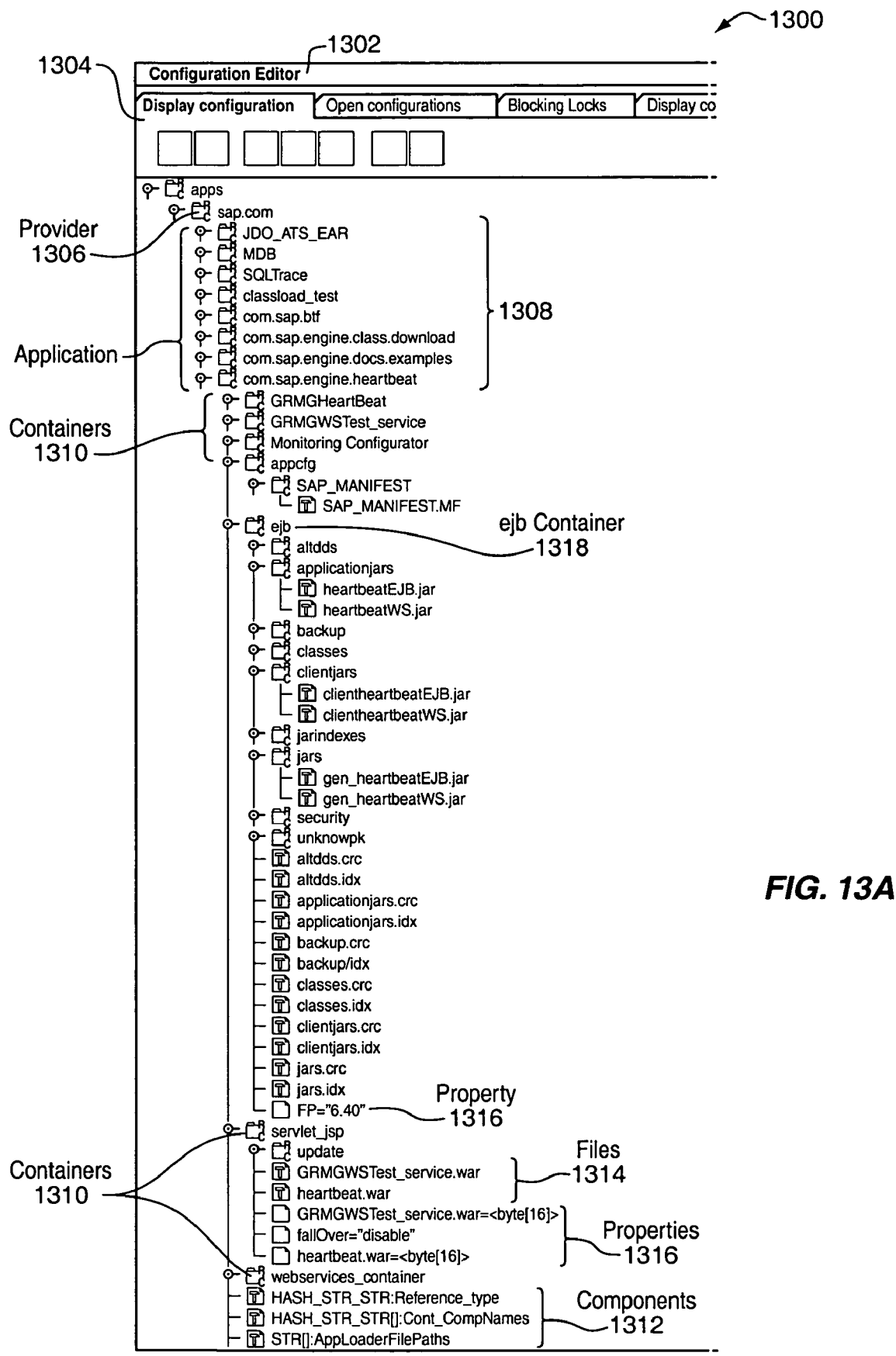
FIG. 13A is an exemplary illustration of an embodiment of a deploy service tree.
Figure 13B:
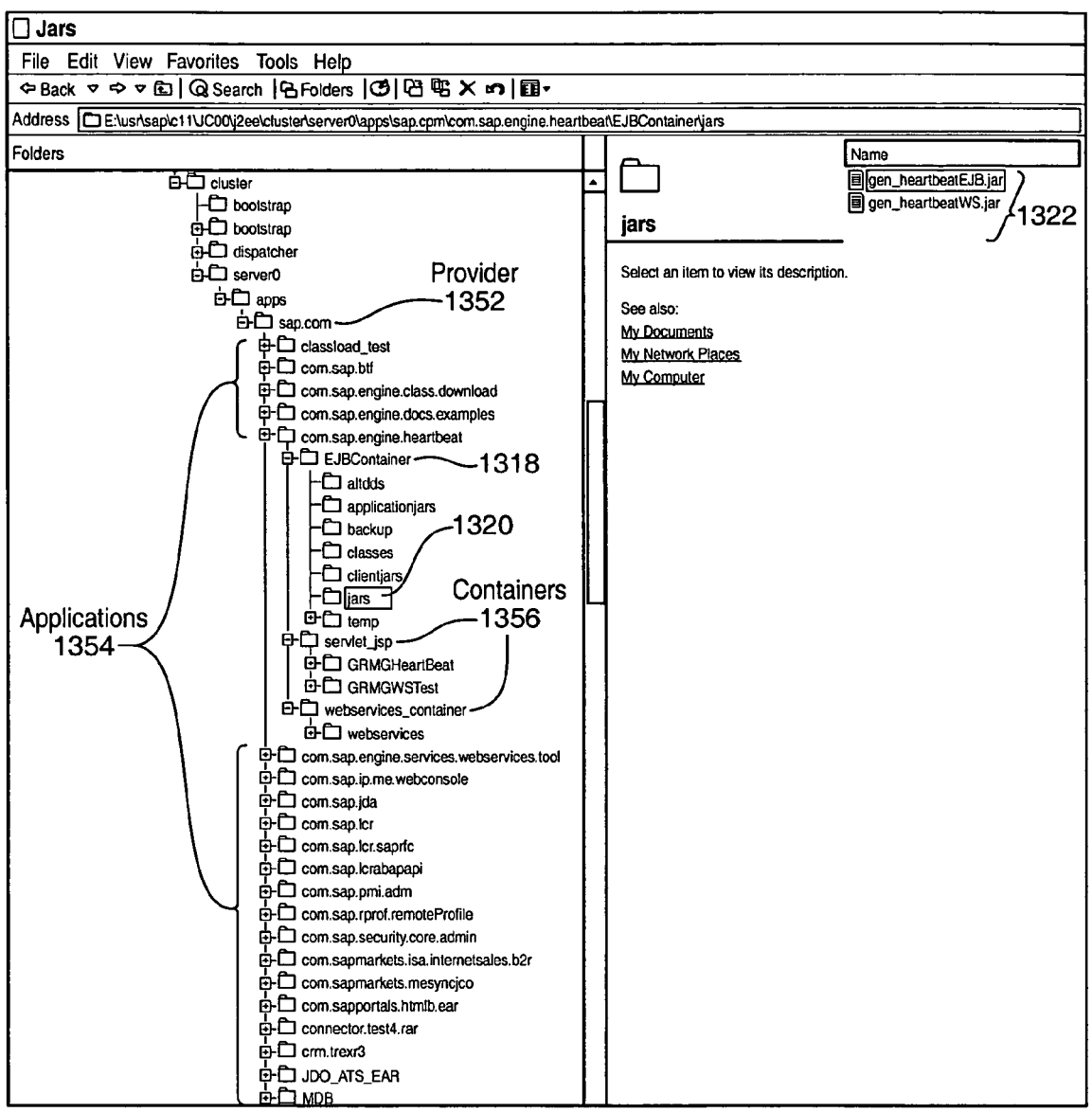
FIG. 13B is an exemplary illustration of an embodiment of a deploy service tree.

FIG. 13A is an exemplary illustration of an embodiment of a deploy service tree 1300. In the illustrated embodiment, the deploy service tree 1300 is shown using a configuration editor 1302 having a display configuration tab 1304. The display configuration tab 1304 illustrates a set of entities managed by a deploy service according to one embodiment. The set of entities include a provider 1306, such as SAP AG. The set of entities further includes deployed applications 1308, containers 1310, components 1312, files 1314, and properties 1316. As an example, the EJB container 1318 includes a jar file/directory 1320 which includes a set of components 1322, such as gen_heartbeatEJB.jar and gen_heartbeatWS.jar (FIG. 13B). The provider 1306 (e.g., SAP) refers to an implementer or supplier of the J2EE architecture compliant product. The provider 1306 may include an operating system vendor, database system vendor, application server vendor, or Web server vendor. The provider 1306 may be responsible for providing an implementation of a variety of defined interfaces (e.g., javax.enterprise.deploy.spi) package. The provider's 1306 implementation of this package may be referred to as plugin and/or server plugin.

FIG. 13B is an exemplary illustration of an embodiment of a deploy service tree 1350. In the illustrated embodiment, the deploy service tree 1350 includes a provider 1352 deployed applications 1354, containers 1356 including an EJB container 1318. The EJB container 1318 (from FIG. 13A), for example, may include a set of jar file/directory 1320. The components 1322 (e.g., gen_heartbeatEJB.jar and gen_heartbeatWS.jar) of the jar file 1320 are illustrated in the right half of the illustration.

Figure 14:
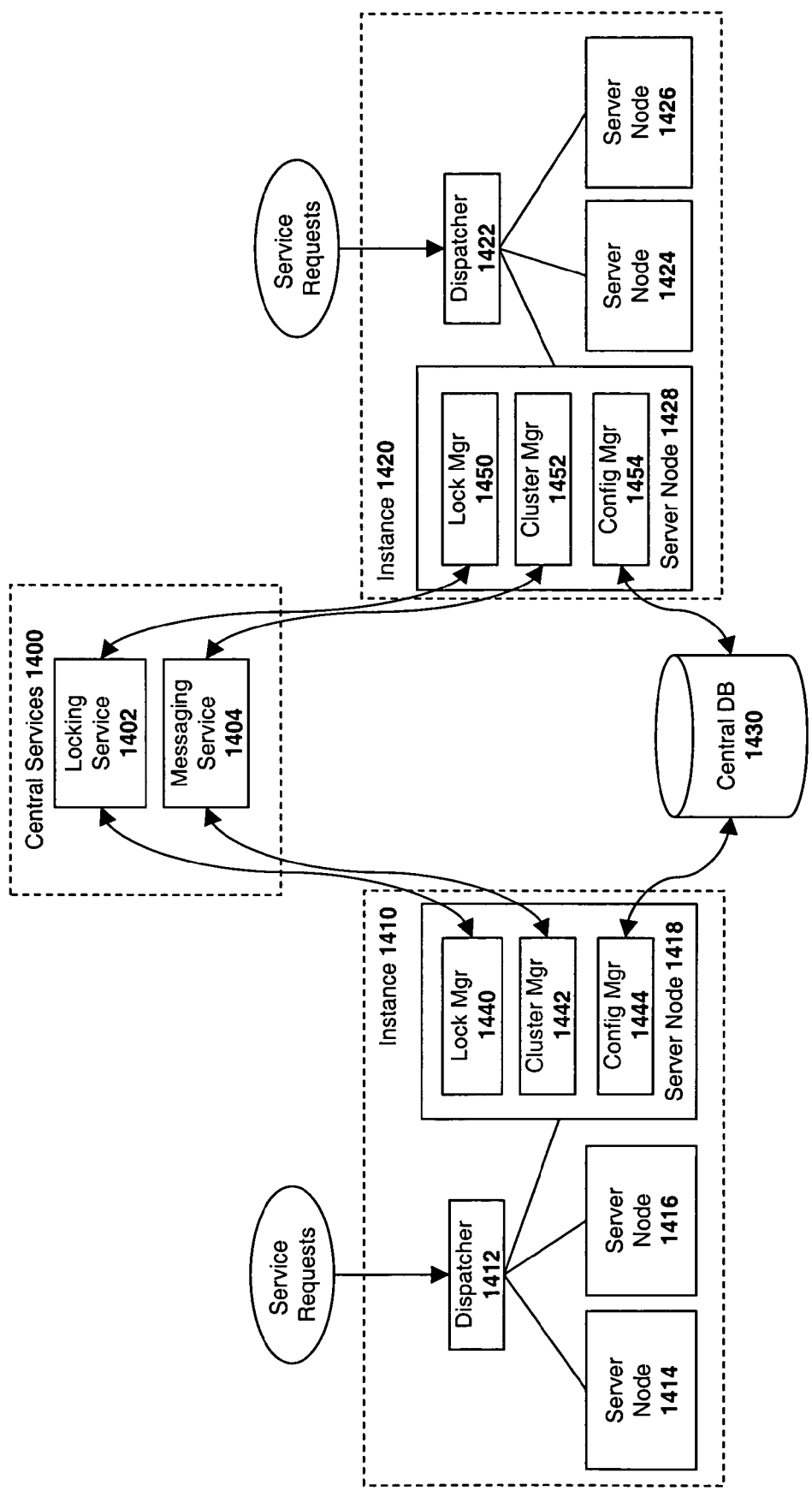
FIG. 14 is a block diagram illustrating an embodiment of a server node system architecture.

A system architecture according to one embodiment of the invention is illustrated in FIG. 14. The architecture includes a central services instance 1400 and a plurality of application server instances 1410, 1420. As used herein, the application server instances, 1410 and 1420, each include a group of server nodes 1414, 1416, 1418 and 1424, 1426, 1428, respectively, and a dispatcher, 1412, 1422, respectively. The central services instance 1400 includes a locking service 1402 and a messaging service 1404 (described below). The combination of all of the application server instances 1410, 1420 and the central services instance 1400 is referred to herein as a "cluster." Although the following description will focus solely on instance 1410 for the purpose of explanation, the same principles apply to other instances such as instance 1420.

The server nodes 1414, 1416, 1418 within instance 1410 provide the business and/or presentation logic for the network applications supported by the system. Each of the server nodes 1414, 1416, 1418 within a particular instance 1410 may be configured with a redundant set of application logic and associated data. In one embodiment, the dispatcher 1410 distributes service requests from clients to one or more of the server nodes 1414, 1416, 1418 based on the load on each of the servers. For example, in one embodiment, the dispatcher 1410 implements a round-robin policy of distributing service requests.

The server nodes 1414, 1416, 1418 may be Java 2 Enterprise Edition ("J2EE") server nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft .NET platforms and/or the Advanced Business Application Programming ("ABAP") platforms developed by SAP AG, the assignee of the present application.

In one embodiment, communication and synchronization between each of the instances 1410, 1420 is enabled via the central services instance 1400. As illustrated in FIG. 14, the central services instance 1400 includes a messaging service 1404 and a locking service 1402. The message service 1404 allows each of the servers within each of the instances to communicate with one another via a message passing protocol. For example, messages from one server may be broadcast to all other servers within the cluster via the messaging service 1404 (e.g., such as the cache configuration messages described below). Alternatively, messages may be addressed directly to specific servers within the cluster (i.e., rather than being broadcast to all servers).

In one embodiment, the locking service 1402 disables access to (i.e., locks) certain specified portions of configuration data and/or program code stored within a central database 1430 or resources shared in the cluster by different services. The locking manager locks data on behalf of various system components which need to synchronize access to specific types of data and program code (e.g., such as the configuration managers 1444, 1454). As described in detail below, the locking service enables a distributed caching architecture for caching copies of server/dispatcher configuration data.

In one embodiment, the messaging service 1404 and the locking service 1402 are each implemented on dedicated servers. However, the messaging service 1404 and the locking service 1402 may be implemented on a single server or across multiple servers while still complying with the underlying principles of the invention.

As illustrated in FIG. 14, each server node (e.g., 1418, 1428) includes a lock manager 1440, 1450 for communicating with the locking service 1402; a cluster manager 1442, 1452 for communicating with the messaging service 1404; and a configuration manager 1444, 1454 for communicating with a central database 1430 (e.g., to store/retrieve configuration data as described herein). Although the lock manager 1440, 1450, cluster manager 1442, 1452 and configuration manager 1444, 1454 are illustrated only with respect to server nodes 1418 and 1428 in FIG. 14, each of the server nodes 1414, 1416, 1424 and 1426 and/or on the dispatchers 1412, 1422 may be equipped with equivalent lock managers, cluster managers and configuration managers while still complying with the underlying principles of the invention.

Figure 15:
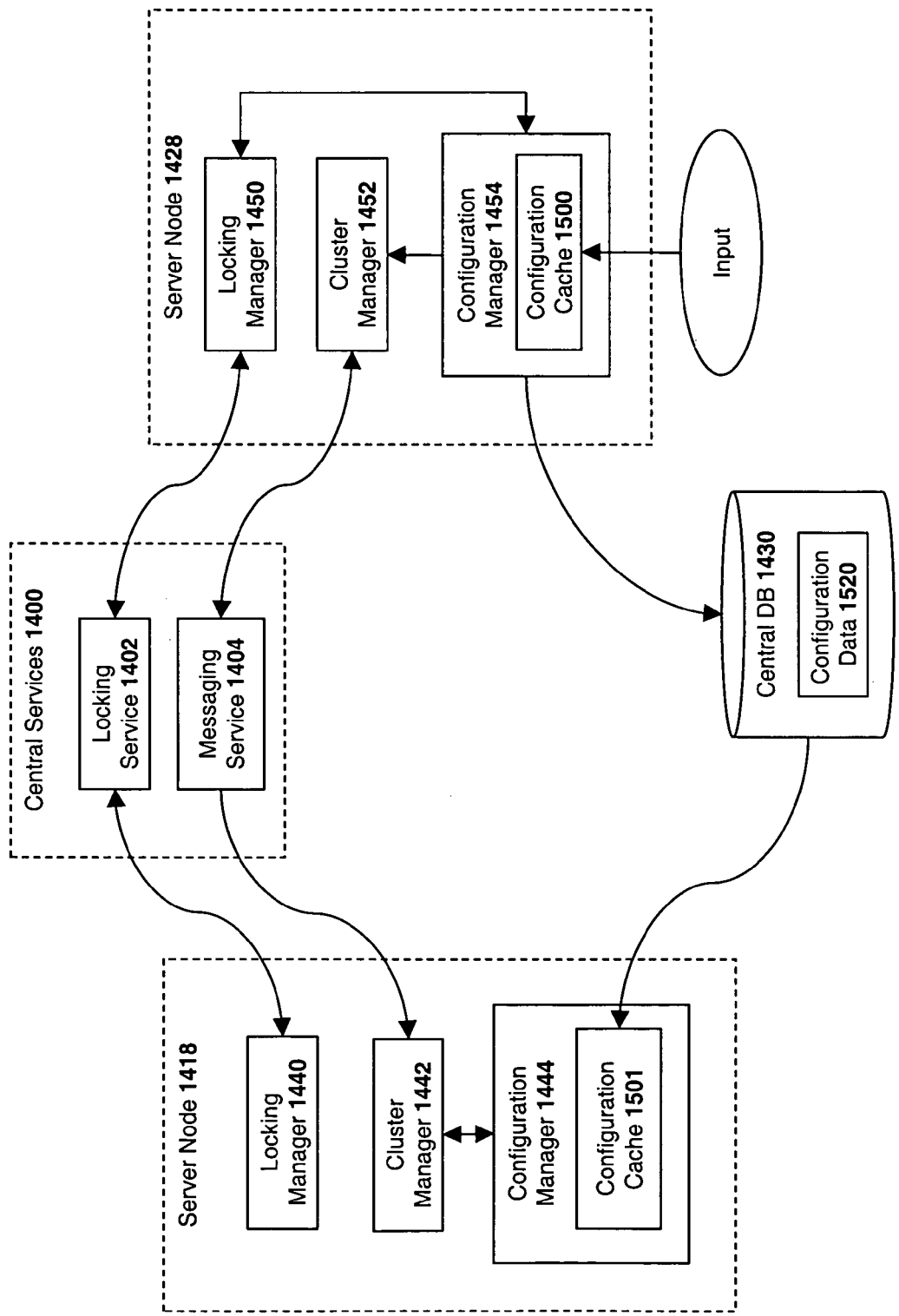
FIG. 15 is a block diagram illustrating an embodiment of a server node architecture which employs a configuration data caching.

Referring now to FIG. 15, in one embodiment, configuration data 1520 defining the configuration of the central services instance 1400 and/or the server nodes and dispatchers within instances 1410 and 1420, is stored within the central database 1430. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc), and various other types of information related to the cluster. It should be noted, however, that the underlying principles of the invention are not limited to any particular set of configuration data.

In one embodiment of the invention, to improve the speed at which the various servers and dispatchers access the configuration data, the configuration managers 1444, 1454 cache configuration data locally within configuration caches 1500, 1501. As such, to ensure that the configuration data within the configuration caches 1500, 1501 remains up-to-date, the configuration managers 1444, 1454 implement cache synchronization policies, as described herein.

Figure 16:
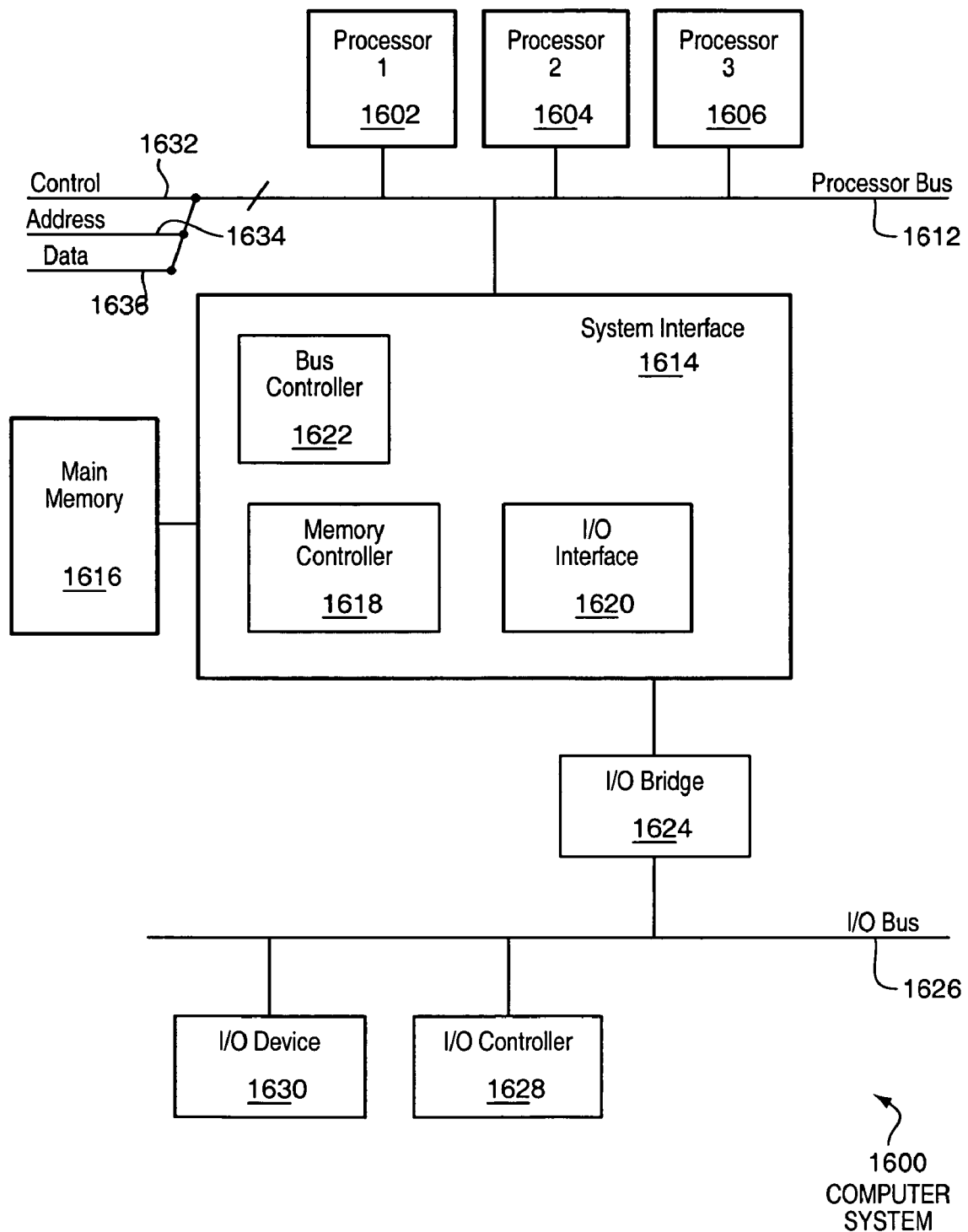
FIG. 16 is an exemplary computer system used for implementing an embodiment of the present invention.

FIG. 16 is an exemplary computer system 1600 used in implementing an embodiment of the present invention. The computer system (system) 1600 includes one or more processors 1602-1606. The processors 1602-1606 may include one or more single-threaded or multi-threaded processors. A typical multi-threaded processor may include multiple threads or logical processors, and may be capable of processing multiple instruction sequences concurrently using its multiple threads. Processors 1602-1606 may also include one or more internal levels of cache (not shown) and a bus controller or bus interface unit to direct interaction with the processor bus 1612.

Processor bus 1612, also known as the host bus or the front side bus, may be used to couple the processors 1602-1606 with the system interface 1614. Processor bus 1612 may include a control bus 1632, an address bus 1634, and a data bus 1636. The control bus 1632, the address bus 1634, and the data bus 1636 may be multidrop bi-directional buses, e.g., connected to three or more bus agents, as opposed to a point-to-point bus, which may be connected only between two bus agents.

System interface 1614 (or chipset) may be connected to the processor bus 1612 to interface other components of the system 1600 with the processor bus 1612. For example, system interface 1614 may include a memory controller 1618 for interfacing a main memory 1616 with the processor bus 1612. The main memory 1616 typically includes one or more memory cards and a control circuit (not shown). System interface 1614 may also include an input/output (I/O) interface 1620 to interface one or more I/O bridges or I/O devices with the processor bus 1612. For example, as illustrated, the I/O interface 1620 may interface an I/O bridge 1624 with the processor bus 1612. I/O bridge 1624 may operate as a bus bridge to interface between the system interface 1614 and an I/O bus 1626. One or more I/O controllers and/or I/O devices may be connected with the I/O bus 1626, such as I/O controller 1628 and I/O device 1630, as illustrated. I/O bus 1626 may include a peripheral component interconnect (PCI) bus or other type of I/O bus.

System 1600 may include a dynamic storage device, referred to as main memory 1616, a RAM, or other devices coupled to the processor bus 1612 for storing information and instructions to be executed by the processors 1602-1606. Main memory 1616 also may be used for storing temporary variables or other intermediate information during execution of instructions by the processors 1602-1606. System 1600 may include a ROM and/or other static storage device coupled to the I/O bus 1626 for storing static information and instructions for the processors 1602-1606.

Main memory 1616 or dynamic storage device may include a magnetic disk or an optical disc for storing information and instructions. I/O device 1630 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 1630 may also include an input device (not shown), such as an alphanumeric input device, including alphanumeric and other keys for communicating information and/or command selections to the processors 1602-1606. Another type of user input device includes cursor control, such as a mouse, a trackball, or cursor direction keys for communicating direction information and command selections to the processors 1602-1606 and for controlling cursor movement on the display device.

System 1600 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 1600 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 200 may vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 17:
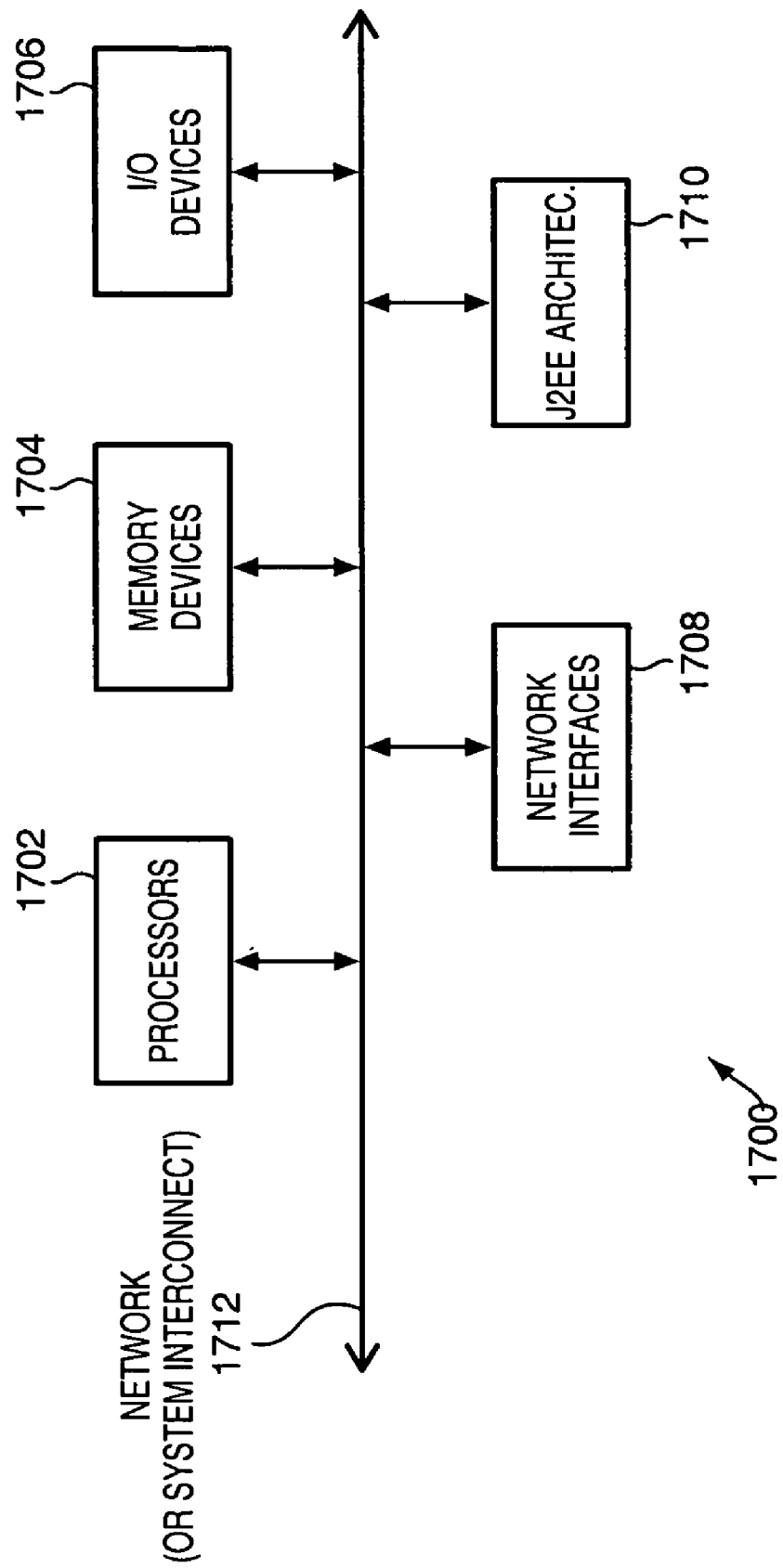
FIG. 17 is a block diagram illustrating an embodiment of a node implementation in a network.

FIG. 17 is a block diagram illustrating an embodiment of a node 1700 implementation in a network. According to one embodiment, the node 1700 may include one or more processors 1702 (e.g., processors 1602-1606 of FIG. 16), one or more memory devices 1704 (e.g., main memory 1616 of FIG. 16), one or more Input/Output (I/O) devices 1706 (e.g., I/O devices 1630 of FIG. 16), one or more network interfaces 1708, and J2EE architecture 1710, directly or indirectly, connected together and in communication with the network through a system or network interconnect 1712. The processors 1702 may include microprocessors, microcontrollers, FPGAs, ASICs, central processing units (CPUs), programmable logic devices (PLDs), and similar devices that access instructions from a system storage (e.g., memory 1704), decode them, and execute those instructions by performing arithmetic and logical operations.

The J2EE architecture 1710 may include a deploy service based on various J2EE and non-J2EE containers, components, resources, services, and interfaces. The J2EE and non-J2EE components may include executable content, control logic (e.g., ASIC, PLD, FPGA, etc.), firmware, or some combination thereof, in one embodiment of the present invention. In embodiments of the invention in which the J2EE architecture 1710 may include executable content, it may be stored in the memory device 1704 and executed by the control processor 1702.

Memory devices 1704 may encompass a wide variety of memory devices including ROM, EPROM, EEPROM, RAM, non-volatile random access memory (NVRAM), cache memory, flash memory, and other memory devices. Memory devices 1704 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory devices 1704 may store program modules, such as routines, programs, objects, images, data structures, program data, and other program modules that perform particular tasks or implement particular abstract data types that facilitate system use.

The I/O devices 1706 may include hard disk drive interfaces, magnetic disk drive interfaces, optical drive interfaces, parallel ports, serial controllers or super I/O controllers, serial ports, universal serial bus (USB) ports, display device interfaces (e.g., video adapters), network interface cards (NICs), sound cards, modems, and the like. System interconnect or network 1712 may permit communication between the various elements of node 1700. System interconnects 1712 may include a wide variety of signal lines including one or more of memory buses, peripheral buses, local buses, host buses, and bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method for implementing and using a deploy system for deployment of entities, comprising:

deploying first components at a first container corresponding to a first software application associated with a first programming engine, the first components relating to the first software application;

deploying second components at a second container corresponding to a second software application associated with a second programming engine, the second components relating to the second software application, the first and second components including deployment components to perform deployment services relating to the first and second software applications at an application server of a computer system; and establishing a communication interface to facilitate bi-directional communication between the first software application and the second software application such that the first software application accesses one or more of the deployed second components at the second container, and the second software application accesses one or more of the deployed first components at the first container, wherein the first container is a Java 2 Enterprise Edition (J2EE) container, wherein the communication interface includes one or more of a deploy service application programming interface (API), a container API, and a deploy callback API, and wherein the deployment services include one or more of a start operation, a stop operation, a remove operation, and an update operation.

2. The method of claim 1, wherein the first programming engine includes an Advanced Business Application Programming (ABAP) engine, and the second programming engine includes a Java 2 Enterprise Edition (J2EE) engine.

3. A system including at least one processor for implementing and using a deploy system for deployment of entities, comprising:

a server computer system in a network of server computer systems, the server computer system including an application server to deploy first components at a first container corresponding to a first software application associated with a first programming engine, the first components relating to the first software application;

deploy second components at a second container corresponding to a second software application associated with a second programming engine, the second components relating to the second software application, the first and second components including deployment components to perform deployment services relating to the first and second software applications; and establish a communication interface to facilitate bi-directional communication between the first software application and the second software application such that the first software application accesses one or more of the deployed second components at the second container, and the second software application accesses one or more of the deployed first components at the first container, wherein the first container is a Java 2 Enterprise Edition (J2EE) container, wherein the communication interface includes one or more of a deploy service application programming interface (API), a container API, or a deploy callback API, and wherein the deployment services include one or more of a start operation, a stop operation, a remove operation, and an update operation.

4. A machine-readable storage medium comprising instructions which, when executed, cause a machine to:
  deploy first components at a first container corresponding to a first software application associated with a first programming engine, the first components relating to the first software application;
  deploy second components at a second container corresponding to a second software application associated with a second programming engine, the second components relating to the second software application, the first and second components including deployment components to perform deployment services relating to the first and second software applications at an application server of a computer system; and
  establish a communication interface to facilitate bi-directional communication between the first software application and the second software application such that the first software application accesses one or more of the deployed second components at the second container, and the second software application accesses one or more of the deployed first components at the first container,
  wherein the first container is a Java 2 Enterprise Edition (J2EE),
  wherein the communication interface includes one or more of the following: a deploy service application programming interface (API), a container API, and a deploy callback API, and
  wherein the deployment services include one or more of a start operation, a stop operation, a remove operation, and an update operation.

5. The machine-readable storage medium of claim 4, wherein the first programming engine includes an Advanced Business Application Programming (ABAP) engine, and the second programming engine includes a Java 2 Enterprise Edition (J2EE) engine.

* * * * *